(12) United States Patent
Murakowski et al.

(10) Patent No.: US 12,407,414 B2
(45) Date of Patent: *Sep. 2, 2025

(54) DISTRIBUTED ARRAY FOR DIRECTION AND FREQUENCY FINDING

(71) Applicant: PHASE SENSITIVE INNOVATIONS, INC., Newark, DE (US)

(72) Inventors: Janusz Murakowski, Bear, DE (US); Christopher Schuetz, Avondale, PA (US); Garrett Schneider, New Castle, DE (US); Shouyuan Shi, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,365

(22) Filed: Oct. 24, 2023

(65) Prior Publication Data

US 2024/0056186 A1 Feb. 15, 2024

Related U.S. Application Data

(60) Continuation of application No. 17/151,565, filed on Jan. 18, 2021, now Pat. No. 11,838,050, which is a
(Continued)

(51) Int. Cl.
*H04B 10/2575* (2013.01)
*H04B 10/00* (2013.01)
*H04B 10/69* (2013.01)

(52) U.S. Cl.
CPC ......... *H04B 10/2575* (2013.01); *H04B 10/00* (2013.01); *H04B 10/69* (2013.01); *H04B 2210/006* (2013.01)

(58) Field of Classification Search
None
See application file for complete search history.

(56) References Cited

U.S. PATENT DOCUMENTS

| 4,736,463 A | 4/1988 | Chavez |
| 4,748,686 A | 5/1988 | Glomb |

(Continued)

FOREIGN PATENT DOCUMENTS

WO 2010/085889 A1 8/2010

OTHER PUBLICATIONS

Akiyama et al., "Two-Dimensional Optical Signal-Processing Beamformer Using Multilayer Polymeric Optical Waveguide Arrays", IEEE Transactions on Microwave Theory and Techniques, vol. 49, No. 10, Oct. 2001, pp. 2055-2061.
(Continued)

*Primary Examiner* — Jai M Lee
(74) *Attorney, Agent, or Firm* — Muir Patent Law, PLLC

(57) ABSTRACT

An optical imaging system and method that reconstructs RF sources in k-space by utilizing interference amongst modulated optical beams. The system and method involves recording with photodetectors the interference pattern produced by RF-modulated optical beams conveyed by optical fibers having unequal lengths. The photodetectors record the interference, and computational analysis using known tomography reconstruction methods is performed to reconstruct the RF sources in k-space.

45 Claims, 30 Drawing Sheets

Related U.S. Application Data continuation of application No. 16/430,877, filed on Jun. 4, 2019, now Pat. No. 10,897,309, which is a division of application No. 15/956,545, filed on Apr. 18, 2018, now Pat. No. 10,313,012, which is a continuation-in-part of application No. 15/227,859, filed on Aug. 3, 2016, now Pat. No. 10,009,098.

(60) Provisional application No. 62/486,474, filed on Apr. 18, 2017, provisional application No. 62/200,626, filed on Aug. 3, 2015.

(56) References Cited

U.S. PATENT DOCUMENTS

| | | | |
|---|---|---|---|
| 4,802,149 A | 1/1989 | Moore | |
| 5,253,171 A | 10/1993 | Hsiao et al. | |
| 5,274,381 A | 12/1993 | Riza | |
| 5,477,230 A | 12/1995 | Tsui | |
| 5,923,291 A | 7/1999 | Page | |
| 6,020,850 A | 2/2000 | Ji et al. | |
| 6,091,523 A | 7/2000 | Brandstetter | |
| 6,777,684 B1 | 8/2004 | Volkov et al. | |
| 7,187,492 B1 | 3/2007 | Shay | |
| 7,436,588 B2 | 10/2008 | Rothenberg et al. | |
| 7,903,257 B2 | 3/2011 | De Boer et al. | |
| 8,159,737 B2 * | 4/2012 | Martin | G01S 13/89 359/341.1 |
| 8,223,128 B1 | 7/2012 | Edwards et al. | |
| 8,260,144 B2 * | 9/2012 | Gupta | H04L 27/2096 398/115 |
| 9,544,510 B2 * | 1/2017 | Murakowski | G01B 15/04 |
| 10,128,952 B2 * | 11/2018 | Morton | H04B 10/25759 |
| 10,218,438 B2 * | 2/2019 | Murakowski | H04B 7/08 |
| 10,224,628 B2 * | 3/2019 | Vidal Drummond | H04B 10/2575 |
| 10,911,142 B2 * | 2/2021 | Murakowski | H04B 10/11 |
| 11,838,050 B2 * | 12/2023 | Murakowski | H04B 10/2575 |
| 2005/0046861 A1 | 3/2005 | Don et al. | |
| 2006/0145920 A1 | 7/2006 | Stephens et al. | |
| 2009/0027268 A1 * | 1/2009 | Coward | H01Q 3/22 342/375 |
| 2010/0197261 A1 | 8/2010 | Zibrik et al. | |
| 2010/0221015 A1 | 9/2010 | Williams | |
| 2011/0073772 A1 | 3/2011 | Schuetz et al. | |
| 2013/0293411 A1 | 11/2013 | Dehlink et al. | |
| 2014/0015546 A1 | 1/2014 | Frederick et al. | |
| 2014/0050212 A1 | 2/2014 | Braz et al. | |
| 2014/0086469 A1 | 3/2014 | Lefebvre et al. | |
| 2014/0192161 A1 * | 7/2014 | Murakowski | G01B 15/04 348/46 |
| 2014/0218240 A1 | 8/2014 | Kpodzo et al. | |
| 2014/0355991 A1 | 12/2014 | Cameirao et al. | |
| 2015/0229397 A1 | 8/2015 | Shibata et al. | |
| 2015/0346340 A1 | 12/2015 | Yaacobi et al. | |
| 2016/0006516 A1 | 1/2016 | Schuetz et al. | |
| 2017/0034716 A1 | 2/2017 | Dortschy et al. | |
| 2017/0041068 A1 | 2/2017 | Murakowski et al. | |
| 2019/0157757 A1 | 5/2019 | Murakowski | |

OTHER PUBLICATIONS

Blanchard et al: "Coherent Optical Beam Forming with Passive Millimeter-Wave Arrays", Journal Oflightwave Technology, IEEE Service Center, New York, NY, US, vol. 17, No. 3, Mar. 1, 1999 Mar. 1, 1999), XP011029361, ISSN: 0733-8724.

Koepf, "Optical Processor For Phased-Array Antenna Beam Formation", Proc. SPIE 0477, Optical Technology for Microwave Applications I, (Nov. 1, 1987); doi: 10.1117/12.942616, pp. 75-81.

Ogawa et al., "Two-Dimensional Multiple Beam Forming Using Slab-Waveguide-Implemented Photonic Beam Forming Network", pp. 197-200, International Topical Meeting on Microwave Photonics. MWP '96 Technical Digest. Satellite Workshop (1996).

Overmiller et al, Ultrabroadband Phased-array Radio Frequency (RF) Receivers based on opticaltechniques. Terahertz, RF, Millimeter, and Submillimeter-Wave Technology and Application VII, Proc. Of SPIE vol. 8985, 89850U 2014.

Shibata et al., "Spatial Optical Beam-Forming Network for Receiving-Mode Multibeam Array Antenna—Proposal and Experiment", IEEE Transactions on Microwave Theory and Techniques, vol. 50, No. 5, May 2002, pp. 1425-1430.

Extended European Search Report dated Mar. 8, 2019 for corresponding application EP 16833835.8.

* cited by examiner

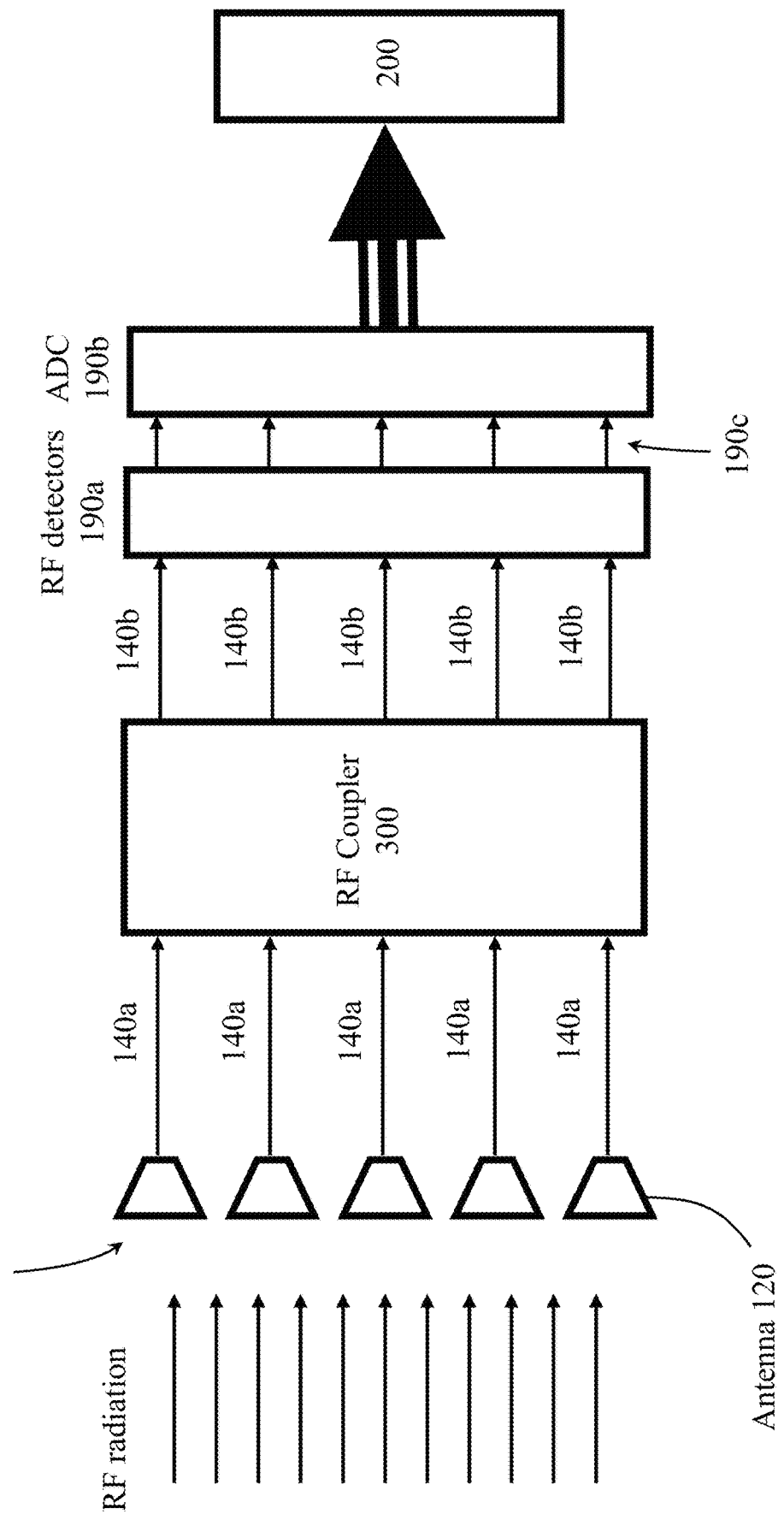

DISTRIBUTED ARRAY FOR DIRECTION AND FREQUENCY FINDING

CROSS-REFERENCES TO RELATED APPLICATIONS

This application is continuation of U.S. application Ser. No. 17/151,565 filed Jan. 18, 2021, which is a continuation of U.S. application Ser. No. 16/430,877, filed Jun. 4, 2019, which is a continuation of U.S. application Ser. No. 15/956, 545 filed Apr. 18, 2018, which is a non-provisional of U.S. Provisional Application 62/486,474 filed Apr. 18, 2017 and a continuation-in-part of U.S. application Ser. No. 15/227, 859 filed Aug. 3, 2016, which claims the benefit of U.S. Provisional Application No. 62/200,626 filed on Aug. 3, 2015, the disclosure of each of these applications being hereby incorporated by reference in its entirety.

FIELD OF TECHNOLOGY

The herein described subject matter and associated exemplary implementations are directed to improvements, extensions and variations of an imaging receiver as described in U.S. Pat. No. 7,965,435 and U.S. Patent Publication No. 2016/0006516, the disclosures of each being hereby incorporated by reference in their entireties.

BACKGROUND

Many existing antenna-array-based receivers are unable to detect both location and frequency of an incoming RF signal without significant filtering or other processing. In such systems, the received broadband radiation is divided into multiple narrow-band channels that are processed individually to determine the information content, and, potentially, the angle of arrival (AoA) of the received radiation. Such processing requires banks of high-speed receivers to sift through the vast amount of data in search of signals of interest. Imaging receivers may rely on distributed aperture to sample incoming electromagnetic radiation, which is then up-converted to optical domain for conveyance and processing. The up-conversion process preserves the phase and amplitude information of radio frequency (RF) waves in the optical domain, which thereby allows optical reconstruction of the RF scene. However, the optical reconstruction in imaging receivers (the spatial location of the optical signals on the image sensor) is dependent on the frequency of the RF waves. Thus, when there are sources of different RF frequency being processed simultaneously, their locations in the real world could not be previously unambiguously identified by imaging receivers. Other types of receivers have similar deficiencies.

SUMMARY

The herein described exemplary implementations provide novel approaches to extracting information about radio frequency (RF) emitters from received electromagnetic radiation, such as electromagnetic radiation ranging between 100 MHz and 300 GHz. The exemplary implementations may provide real-time, simultaneous determination of carrier frequency, amplitude and angle of arrival (AoA) of multiple RF sources in an RF scene. In some exemplary embodiments, instantaneous bandwidth (IBW) may approach 100 GHz. This capability may be achieved without sacrifice of signal-to-noise ratio (SNR), by virtue of an antenna array whose gain more than compensates for the added thermal noise that accompanies such wide IBW. The optical and RF approaches described herein may enable the array's entire field of regard (i.e. its full beam steering range) to be continuously detected and processed in real time.

One exemplary implementation of a receiver includes a phased array antenna having a plurality of antenna elements arranged in a first pattern configured to receive RF signals from at least one RF source. A plurality of RF waveguides each transmit RF signals from each of the antenna elements to an RF coupler with a different time delay between the antenna element and the RF coupler. The RF coupler allows the RF signals to interfere with each other, and has an output interference pattern comprising a plurality of RF interference signals. The interference pattern is detected and used to computationally reconstruct RF sources in k-space.

BRIEF DESCRIPTION OF DRAWINGS

FIGS. 17A-17C illustrate exemplary configurations where RF radiation detected by antennas are transmitted along RF waveguides to an RF coupler, according to certain exemplary embodiments;

DETAILED DESCRIPTION

Figure 1A:
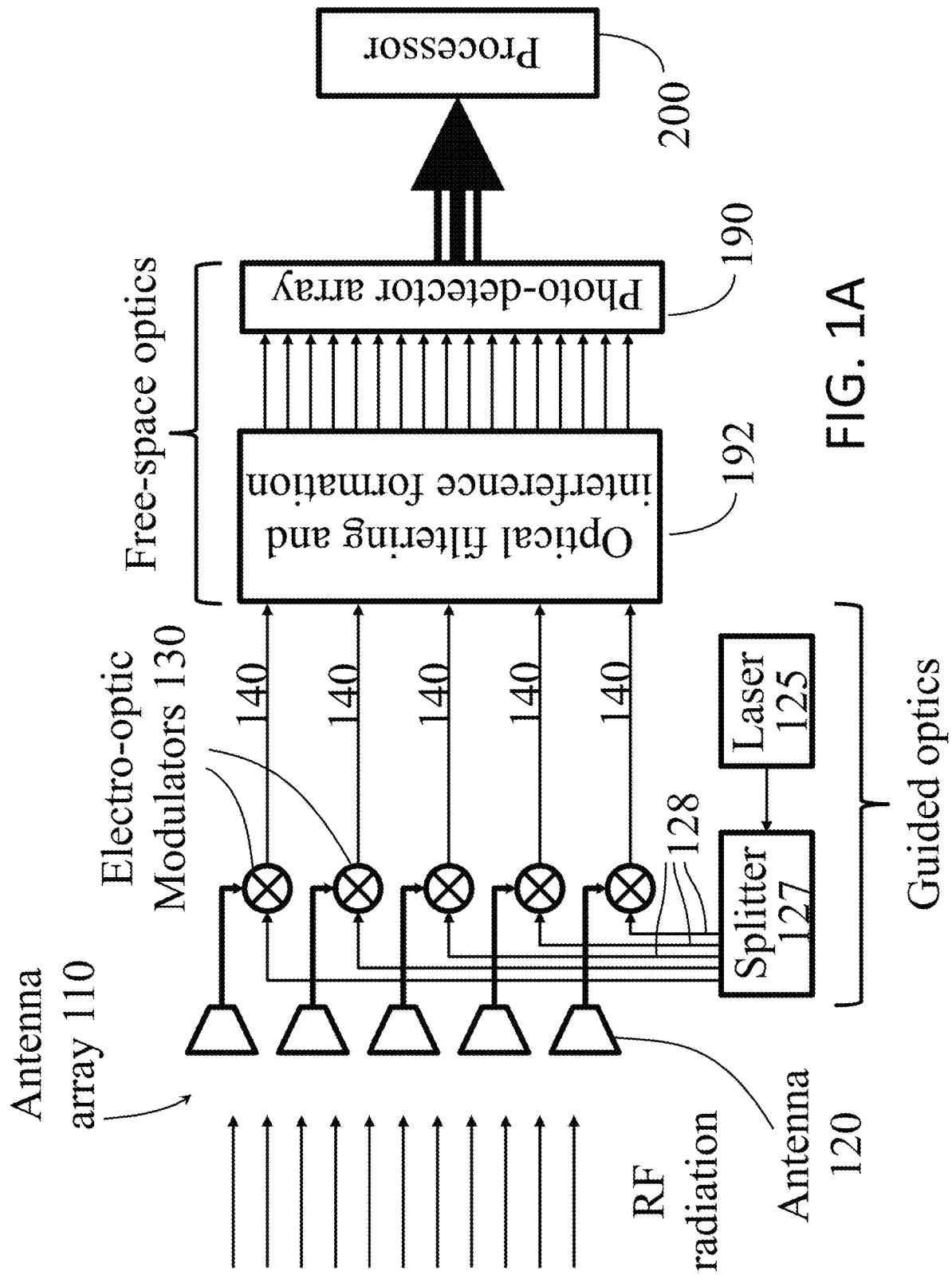
FIG. 1A is an illustration of an RF receiver, according to certain exemplary embodiments.

The present disclosure now will be described more fully hereinafter with reference to the accompanying drawings, in which various exemplary implementations are shown. The invention may, however, be embodied in many different forms and should not be construed as limited to the example exemplary implementations set forth herein. These example exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

Although the figures described herein may be referred to using language such as "one exemplary implementations," or "certain exemplary implementations," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary implementation.

The terminology used herein is for the purpose of describing particular exemplary implementations only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be further understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between"). Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the disclosed technology, features and exemplary implementations are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the exemplary implementations may be physically separated into two or more interacting and discrete blocks, units and/or modules without departing from the scope of the inventive concepts. Further, the blocks, units and/or modules of the exemplary implementations may be physically combined into more complex blocks, units and/or modules without departing from the scope of the inventive concepts.

Aspects of the disclosure are related to devices and associated methods for improving a wideband radio-frequency (RF) phased-array receiver. The embodiments described here may determine a signal's angle of arrival (AoA) and frequency in real time. Aspects of the embodiments provide a signal detection mechanism wherein RF signals are upconverted by fiber-coupled electro-optic modulators driven by the antenna elements of a phased array. The conversion results in sidebands on an optical carrier wave supplied by a laser. These optical sidebands are substantially proportional in power to the RF power incident into each antenna element, and also preserve the phase carried by the incident RF signal. This RF up-conversion allows the optical sidebands to be used to reconstruct an image of the RF energy in the scene.

Figure 1B:
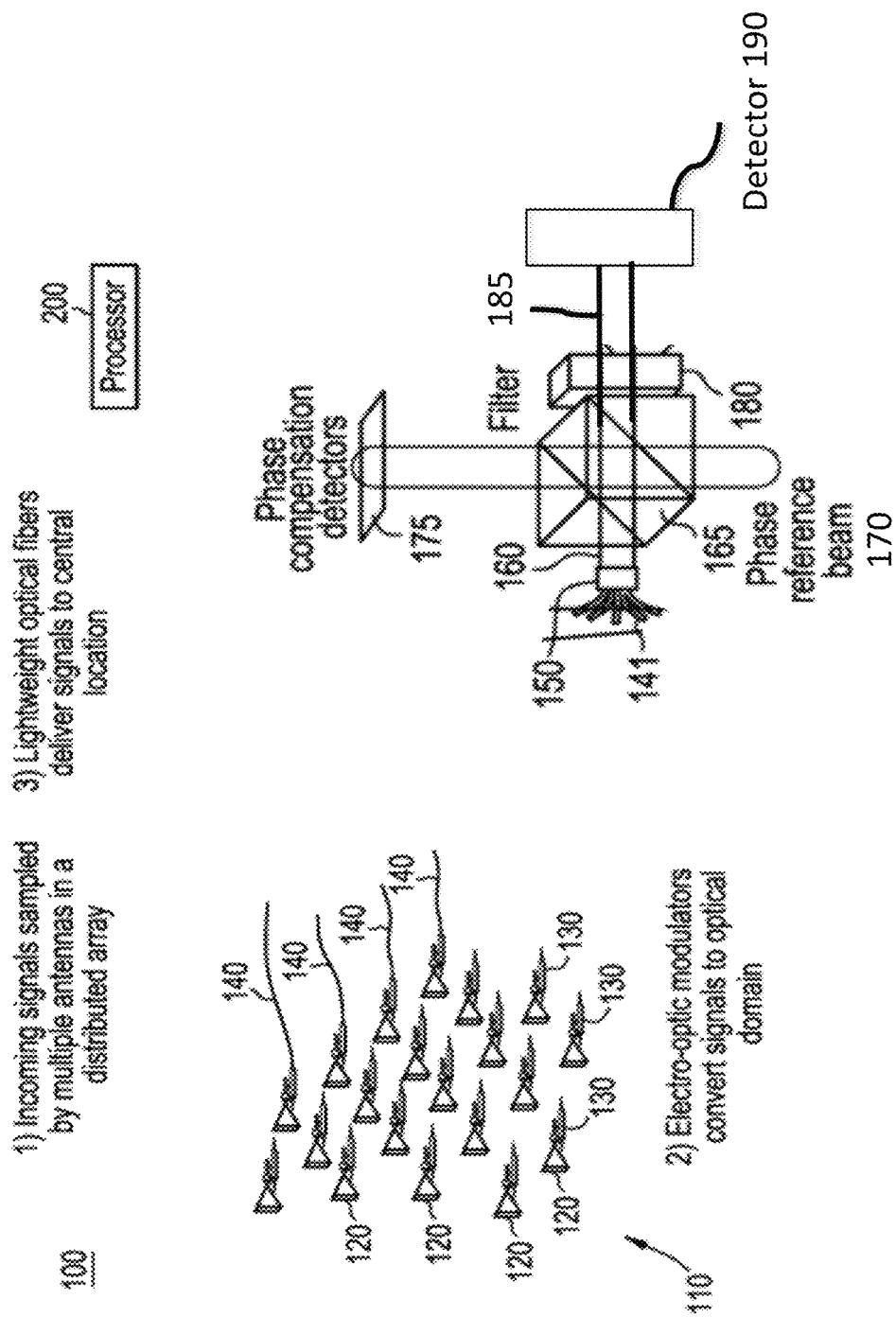
FIG. 1B is another illustration of an RF receiver in accordance with aspects of the invention, according to certain exemplary embodiments.

An imaging receiver 100 in accordance with aspects of the invention is depicted in FIGS. 1A and 1B wherein similar or like elements are identified by the same reference numerals. The illustrated imaging receiver 100 is a phased-array receiver. The imaging receiver 100 includes a processor 200 coupled to the various components within the receiver to implement the functionality described herein. The processor may be a general purpose processor (e.g., part of a general purpose computer, such as a PC) or dedicated processor (e.g., digital signal processor (DSP), FPGA (field programmable gate array)). The processor may be configured with software to control the component of the imaging receiver 100. Variations of suitable processors for use in the imaging receiver 100 will be understood by one of skill in the art from the description herein.

Figure 2A:
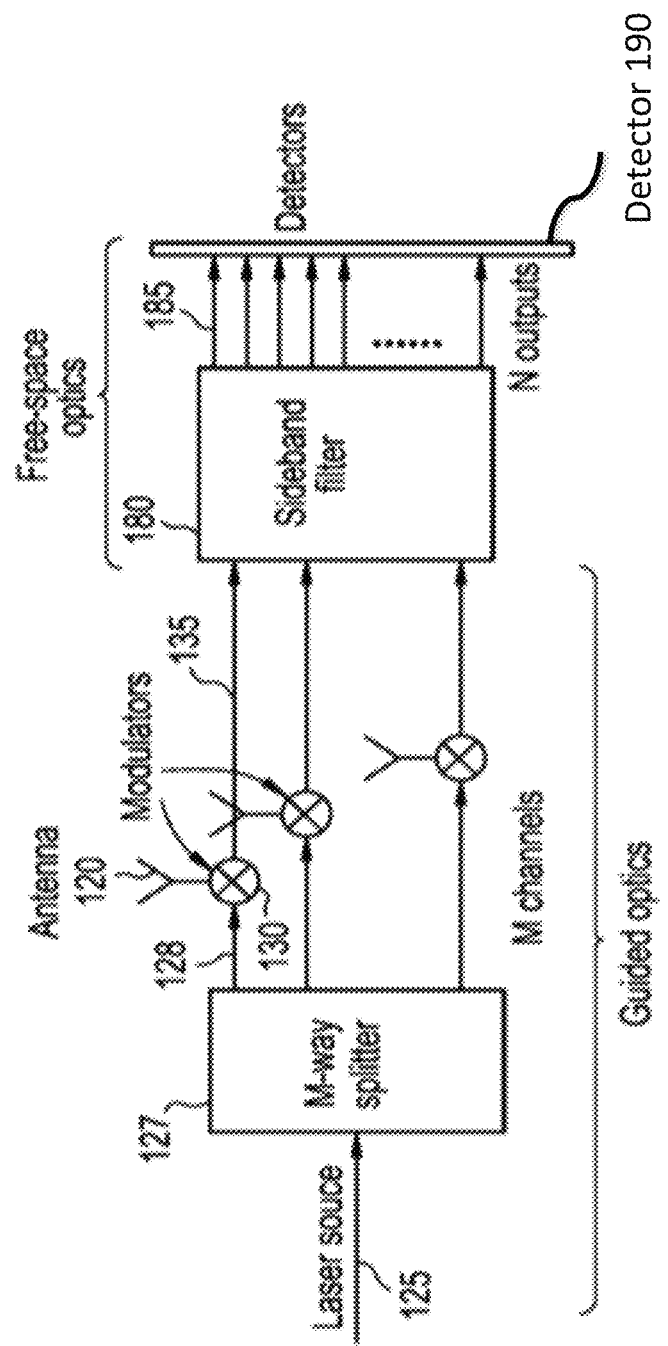
FIGS. 2A, 2B and 2C are block diagrams of components for use with the RF receiver of FIG. 1A or 1B, according to certain exemplary embodiments.
Figure 2B:
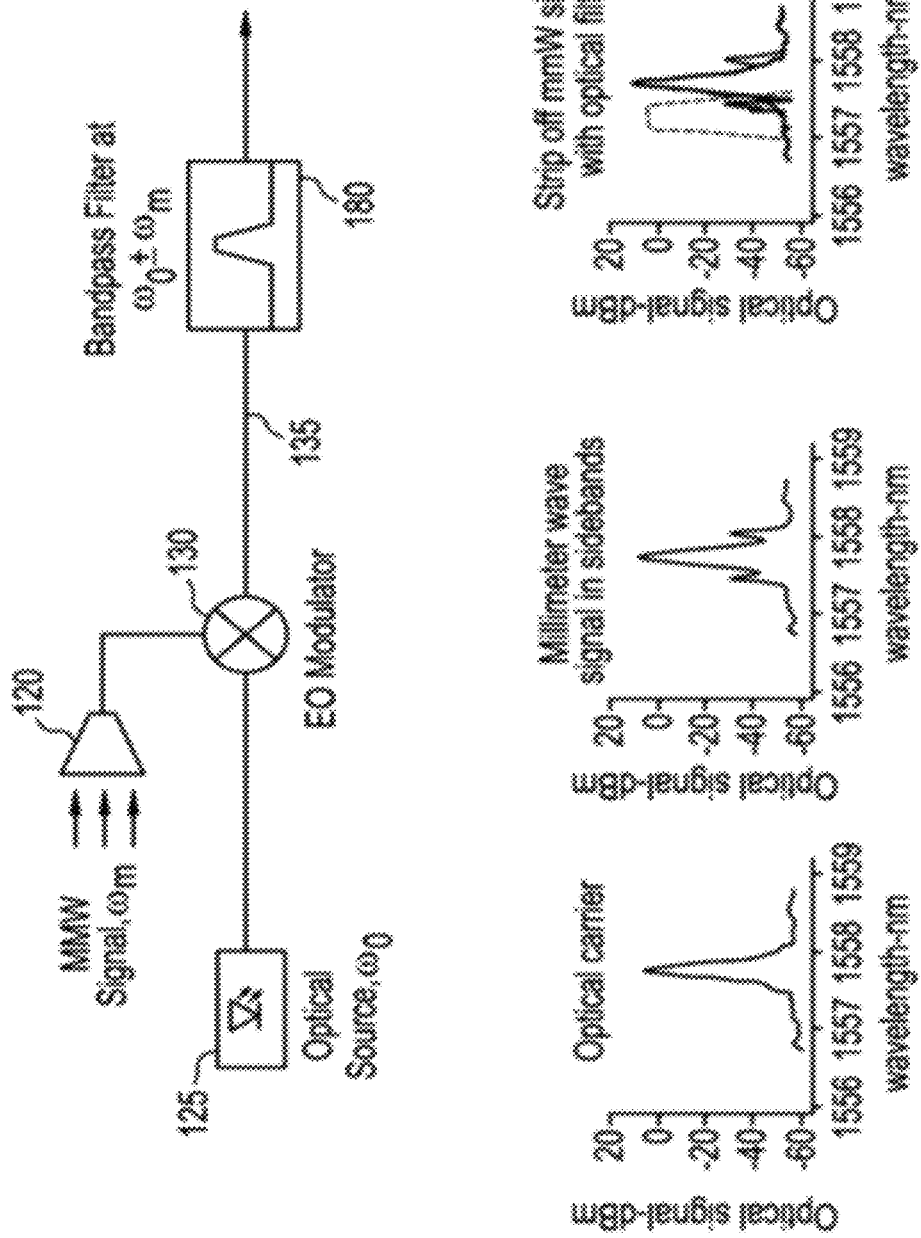

A phased-array antenna 110, e.g., a sparse array of M antenna elements 120 arranged in a first pattern as shown in the example of FIG. 1B, receives RF signals from an external source. Various patterns of the arrangement of the M antenna elements 120 are described further herein, and may include planar arrangements, conformal arrangements conforming to a non-planar three dimensional surface (e.g., a surface of a vehicle, such as the hull of an airplane or helicopter), regularly spaced arrangements (e.g., regularly spaced in a two dimensional array) or an irregularly spaced array. While the antenna elements 120 shown in FIGS. 1A and 1B are horn antennae, those of skill in the art will understand that a variety of antenna means may be used. RF signals sampled at the antenna elements 120 are used to modulate a laser beam split M ways. An electro-optic (EO) modulator 130 is coupled to each of the antenna elements 120 and receives a branch of the split laser beam that it uses to convert the RF energy received at each antenna element 120 to the optical domain. It does so by modulating the optical (carrier) beam produced by the laser 125 (FIGS. 1A, 1B, 2A). The time-variant modulation manifests itself in the frequency domain as a set of sidebands flanking the original carrier frequency (or wavelength), at which the source laser operates, as illustrated in FIG. 2B, which is discussed in more detail below. As a result, the energy radiated in the RF domain appears in the optical domain as sidebands of the carrier frequency. This up-conversion of the RF signal into optical domain may be coherent so that all the phase and amplitude information present in RF is preserved in the optical sidebands. This property of coherence preservation in optical up-conversion allows the recovery of the RF-signal angle of arrival using optical means.

As shown in FIG. 1B, the modulated optical beams containing the laser carrier wavelength and the sidebands with imprinted RF signal are conveyed by optical fibers 140 to a lenslet array 150 (FIG. 1B) coupled to the outputs 141 of the fibers 140 that are arranged in a second pattern. The second pattern may or may not mimic or correspond to the first pattern of the array of the RF antennas at a reduced scale.

Figure 2C:
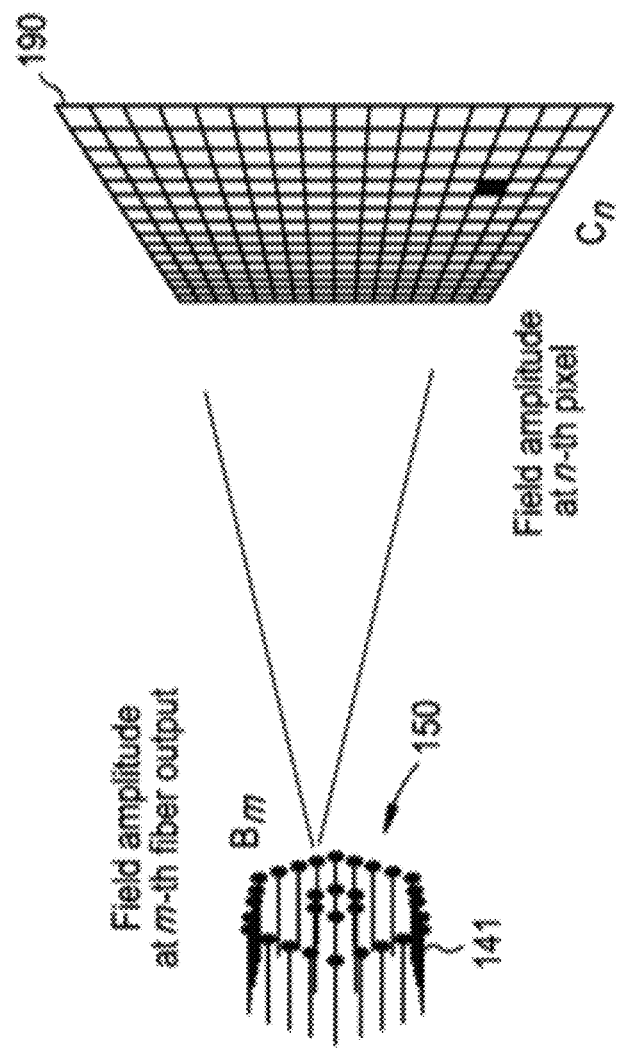

FIG. 2C illustrates the output ends of the optical fibers 140 arranged in a pattern which may correspond to the pattern of the antenna elements 120 of FIG. 1. From the outputs 141 of the optical fibers 140 at the lenslet array 150 on, the beams propagate in free space, no longer guided by the optical fibers, and form a combined beam 160 where the light emanating from fiber outputs interfere. While this embodiment shows conventional optical fibers 140 between the electro-optic modulators 130 and the lenslet array 150, those of skill in the art will appreciate that other optical waveguides or channels may also or instead be used. Similarly, while this embodiment illustrates the use of a free space as a channel for forming a composite optical beams 160 and 185 from light emanating from the outputs of the optical fibers 140, those skilled in the art will appreciate that other optical channels can be used for forming a composite optical beam 160 and/or 185.

As shown in FIG. 1B, the individual beams propagate in free space from the outputs 141 of fibers 140 at the lenslet array 150, which allows the individual beams to interfere with one-another where they overlap to form the combined or composite beam 160. Part of the optical composite beam 160 is split off with a beam-splitter 165, mixed with a reference beam 170, and sent to an array of detectors 175 (phase-compensation detectors) in order to detect, and, if desired, allow for the compensation of, optical phase variation originating in the individual fibers 140 due to environmental conditions such as vibrations and acoustics. An optional band-pass optical filter 180, may strip off the carrier wavelength and allow only one of the sidebands through (see FIG. 2B). The resulting overlapping beams forming a composite beam projected onto photodetector 190, e.g., an image sensor array formed on a semiconductor chip, such as a charge coupled device (CCD) array, CMOS image sensor array, and/or a photodiode array, an optical camera, and/or other standard image sensors. Thus, the overlapping beams form composite beam 185 where they interfere to form a representation of the RF signal in the optical domain.

As shown in FIG. 1A, the free space optics may include optical filtering and interference module 192 and photodetector array 190 which allows the beams emanating from the outputs of fibers 140 to interfere with each other in free space prior to detection and recordation by photodetector array 190.

FIG. 2B illustrates the use of an optical filter 180 to recover or isolate an optical sideband that corresponds to a received RF signal, which may for example be a millimeter wave (MMW) signal having a frequency $\omega_m$. As shown in the graphs of FIG. 2B, the received RF signal(s) from antenna element(s) 120 modulate an optical carrier signal (source) 125 operating at a frequency $\omega_0$ (illustratively at a wavelength between 1557 and 1558 nm). The output 135 of modulator 130 includes an optical analog of the MMW signal in sidebands of the optical carrier as shown in the middle graph. The output 135 of modulator 130 is transmitted via a corresponding optical fiber 140. An optical band-pass filter 180 tuned to $\omega_0+\omega_m$ or $\omega_0-\omega_m$ strips off (isolates) the optical representation of the received MMW signal(s) from the carrier.

FIG. 2A depicts the configuration of an imaging receiver 100 with an emphasis on the optical layer. The single laser source 125 is split M ways by a splitter 127 and the beams 128 are routed through modulators 130 coupled to antennas 120 capturing the RF radiation. The (optical) outputs 135 of the modulators 130 are filtered to allow only a single sideband corresponding to the captured RF radiation to pass, for example using a filter 180 as described with respect to FIG. 2B. The free-space interference of the optical composite beam 185 output from filter 180 among the M different channels yields a pattern measured with detectors 190, as discussed in more detail below.

Note that FIGS. 1 and 2A depict the filter 180 positioned in the free-space portion of the imaging receiver 100 downstream of the lenslet array 150. In some exemplary implementations the filter is optional and is not a necessary component of the system or methodology. In yet other implementations, the filter can be placed anywhere between the modulators 130 and the detector 190 to enable reconstruction of the RF-source position in the optical domain. Furthermore, in some exemplary implementations, especially for frequencies lower than ~5 GHz, a Mach-Zehnder modulator (MZM) may be used to filter out the sideband energy from the optical carrier energy. Such modulators can, under appropriate bias conditions, interferometrically suppress the carrier while passing the (odd-order) sidebands, thereby suppressing the carrier in a frequency-independent manner. In yet other implementations, no physical filter may be used, and the system may rely on the computational reconstruction to account for the presence of the optical carrier in the interference pattern. In yet other implementations, the physical arrangement of the optical channels, including the antennas 120, the lenslet array 150 and/or the optical fiber lengths, and/or the applied optical phases by properly biasing modulators 130, or by other means, may be so organized as to produce the interference pattern of the carrier wavelength significantly separated spatially from the interference pattern produced by the sidebands. Other implementations may combine some or all of the approaches listed above.

The detector 190 of FIGS. 1A and 1B may be an array of photo-detectors such as those of a charged coupled device (CCD) or contact image sensor or CMOS image sensor, which in some embodiments may not be able to process (e.g. decode) information present in the RF signals received by the antenna array 110 with the same performance as high-speed photodiodes. In some exemplary implementations, to extract or recover information encoded in the RF signals input by the antenna elements 120, the composite optical beam output from filter 180 is further split with additional beam-splitters and combined with reference laser beams for heterodyne detection by a high speed photodetector (see, e.g., U.S. Patent Pub. No. 2016/0006516).

Below, further details on the optical capture of the RF scene are presented. To capture the RF scene in the optical domain, the (optical) outputs of the modulators 130 are carried in optical fibers 140 to a lenslet array 150 (FIG. 2C). The arrangement of the optical fibers 140 need not mimic the spatial distribution of the corresponding antennas 120 to which the optical fibers are attached. For example, a sequence of optical fibers along a particular direction may be different than a sequence of the corresponding antennas 120 to which they are attached (a sequence of these antennas 120 along a particular line or curve, e.g.). The fibers may also be split so as to produce a higher number of optical output beams than the number of antennas 120. However, the arrangement of the optical fibers 140 may also mimic the spatial distribution of the antennas 120 to which they are attached. The output beams are then allowed to interfere in free space (or other suitable channel or medium for forming a composite optical signal), and the interference pattern corresponding to the original RF scene is captured by an array of optical sensors such as detector 190 (e.g., a CCD semiconductor chip). Such an interference space may be transparent and may comprise a vacuum, air, a gas other than air, a liquid or a solid (e.g., a lens or a slab waveguide).

Figure 3A:
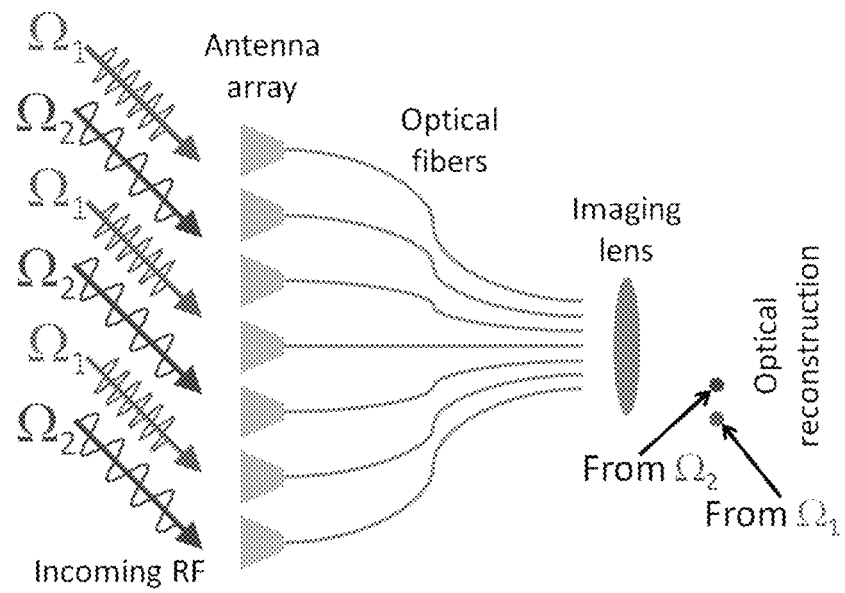
FIGS. 3A, 3B and 3C are schematic drawings illustrating various RF plane waves detected by the imaging receiver of FIG. 1, according to certain exemplary embodiments.

Given that the positions of the individual antenna elements 120 in the array 110 are fixed, the phase relations of waves sampled by these elements depend on both the angle of arrival and on the frequency. For example, in a system where the geometry of the lenslet array 150 matches the geometry of the antenna array 110, two waves arriving at the RF aperture from the same direction but differing in frequency will (normally) reconstruct in the optical domain as bright spots in different positions on the image plane (e.g., on photodetector 190 for detection and processing by processor 200), as shown in FIG. 3A. The amount of spatial offset between different RF waves with different frequencies incident upon the array depends on the incidence angle: for waves arriving at the array along the RF imaging axis, or achromatic axis (which may be considered an incidence angle equal to zero), all RF frequencies reconstruct to a single spot lying on the optical axis of the imaging system. The greater the incidence angle of the RF wave with respect to the RF imaging axis, the greater the spread of the resulting optical image as a function frequency. Using the terminology from the field of imaging optics, such spreading of an image due to change in frequency (wavelength) is referred to herein as chromatic aberration.

The effect of chromatic aberration in the imaging receiver with homothetic arrays 110 and 150 is illustrated in FIG. 3A. It will be appreciated that the optical reconstruction referenced below (e.g., detection of optical spots) may be performed by an imaging receiver, such as the imaging receiver 100 described herein. The optical reconstruction may be captured in real time by detector 190 of the imaging receiver 100. For example, the optical dots discussed herein may be detected by detector 190 and processed by processor 200. For such optical reconstruction, the imaging receiver may use a single detector 190 detecting light of a single composite beam 185 formed from one or more optical fiber bundles (where the outputs of the plural optical bundles described herein are combined), or in certain examples, use a single antenna array 110 that has outputs of separate optical fiber bundles to different ones of plural detectors 190, where each detector 190 is associated with separate optical processing elements described here, and each detector 190 is associated with a separate optical fiber bundle. FIG. 3A illustrates incoming RF radiation at frequencies $\Omega_1$ and $\Omega_2$ incident upon the array. The angle of arrival is identical for the two RF beams, but the frequencies (wavelengths) differ. Reconstructed in optical domain, two spatially-separated spots are formed: one corresponding to incoming frequency $\Omega_1$ and the other to $\Omega_2$.

Figure 3B:
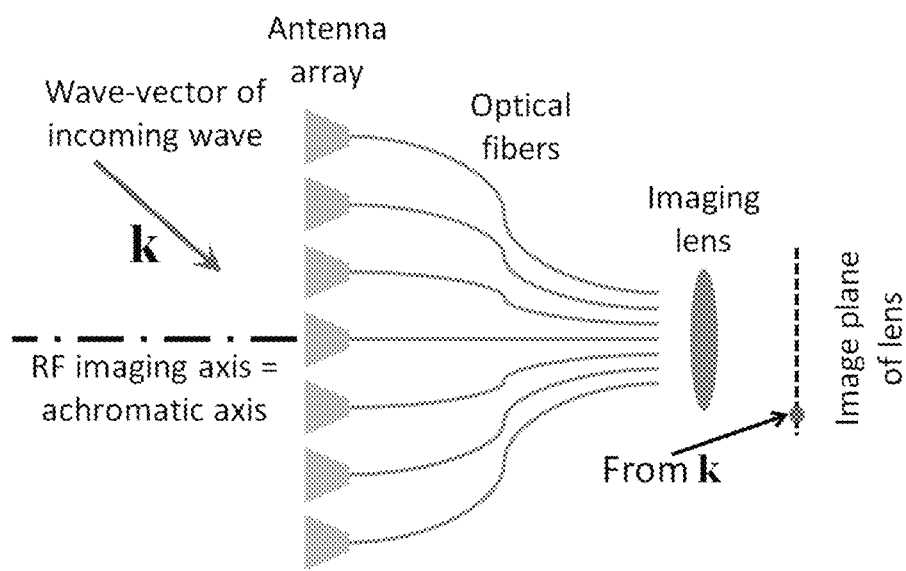
Figure 3C:
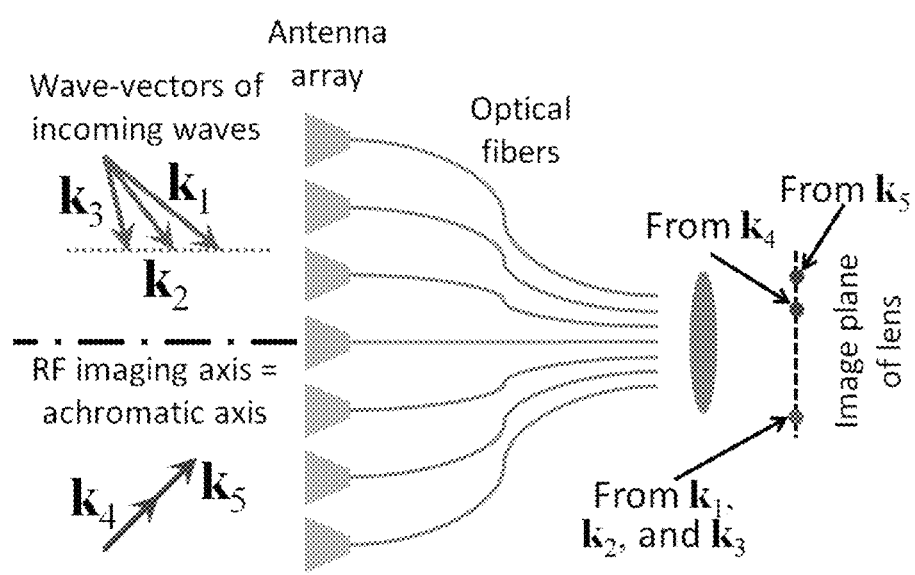

Chromatic aberration can also be understood with the help of wave-vector (or k-space) description of the image reconstruction. An RF plane wave incident upon the antenna array is represented by a wave vector (a k-vector) pointing in a direction perpendicular to the phase-front and having length proportional to the frequency; the k-vector points in the direction of propagation of the wave. The imaging receiver, by virtue of upconverting the RF waves to the optical domain followed by optical reconstruction of the RF waves (e.g., by photodetector 190), may map the k-vectors of the incoming RF waves onto the image plane of the optical lens, see FIG. 3B. The k-vectors corresponding to all possible RF plane waves form a three-dimensional vector space. This 3D space is mapped onto a two-dimensional space: the image plane of the imaging lens, which may correspond to the 2D plane of the photodetector 190 when implemented as an image sensor. The 3D to 2D mapping may be a projection along the achromatic axis of the imaging receiver 100. As a result, k-vectors differing by a vector parallel to the achromatic axis of the imaging receiver 100 are mapped to the same point in the image plane. This situation is shown in FIG. 3C where plane waves corresponding to vectors $k_1$, $k_2$, and $k_3$ are all mapped to a single point in the image plane as they differ from one another by a vector parallel to the achromatic axis. In contrast, wave-vectors $k_4$ and $k_5$ are mapped to two separate points in the image plane even though they are parallel to one another, i.e. they correspond to plane waves coming from the same direction. The difference in length between wave-vectors $k_4$ and $k_5$ is due to the difference in frequency of the underlying RF waves.

In short, the imaging receiver maps the 3D space of wave-vectors to a 2D image plane by projecting the former along the achromatic axis. This leads to chromatic aberration where some waves arriving from the same direction are mapped to different points (e.g. wave-vectors $k_4$ and $k_5$ in FIG. 3C), and certain waves arriving from different directions map to the same point (e.g. wave-vectors $k_1$, $k_2$, and $k_3$ in FIG. 3C).

Figure 4:
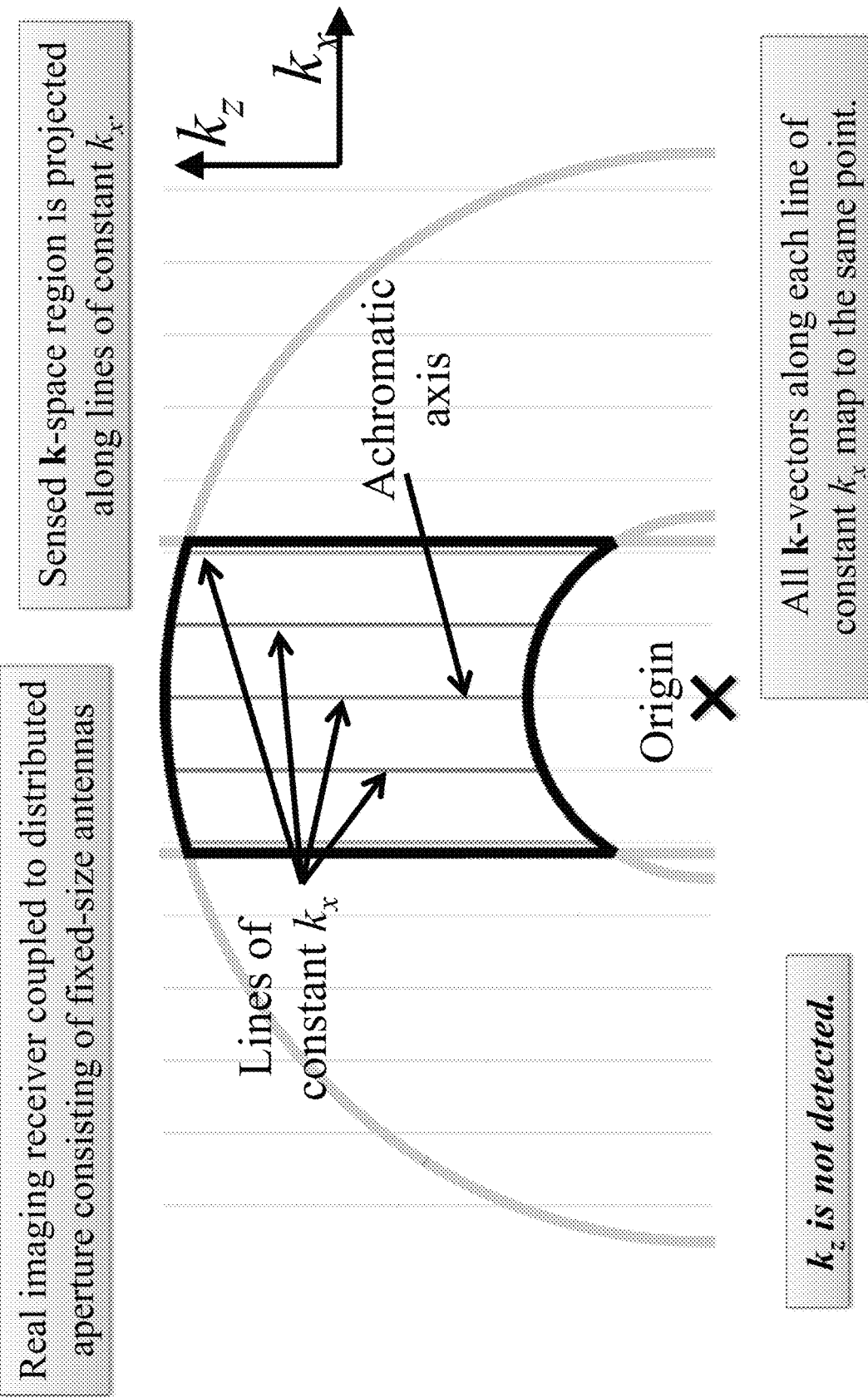
FIG. 4 is a schematic drawing illustrating k-space representation of the imaging receiver, according to certain exemplary embodiments.

The above statement can be understood with the help of FIG. 4, which shows a portion of k-space. In this representation, every point is a k-vector (wave-vector) that corresponds to a plane wave arriving at the receiver. The length of the k-vector (the distance of the point from origin located at the center of the semicircles in FIG. 4) is proportional to the frequency, and the angle of arrival of the wave is the vector's direction. Given this one-to-one correspondence between waves arriving at the receiver and the points in k-space, the latter is helpful when describing the imaging receiver.

Accordingly, since the imaging receiver performs a projection along the achromatic axis, in k-space this projection takes a geometric meaning: points along each of the lines labeled as "Lines of constant $k_x$" in FIG. 4, are represented as a single point in the imaging receiver in this example. FIG. 4 illustrates just five lines of constant $k_x$ for simplicity. The above perspective on the imaging receiver provides means to generalizing the concept and enabling access to information that is captured by the distributed array. The imaging receiver may include structure to implement one or more of the following features:

Sampling the incoming electromagnetic field at discrete points using an array of antennas (120).

Upconversion of the received electromagnetic radiation to optical domain at each of the sampled points. This is accomplished with electro-optic modulators (130).

Conveying the upconverted signals, now in optical domain, using optical fibers (140), one or more fibers per antenna, to a fiber array.

Using fiber array that may be a scaled version of the antenna array.

Free-space propagation (160) and optical processing of light emanating from the output of the fiber array, which contains the information on the received electromagnetic radiation.

Optical capture of the RF scene: The interference pattern within composite beam 185, at every received RF frequency, may correspond to the RF scene observed by the antenna array. The optical capture of the RF scene may be processed to reconstruct the RF scene.

As described herein, information about radio frequency (RF) emitters from received electromagnetic radiation may be extracted. The exemplary implementations may provide real-time, simultaneous determination of carrier frequency, amplitude and angle of arrival (AoA). In some embodiments, instantaneous bandwidth (IBW) may approach 100 GHz. This capability may be achieved without sacrifice of signal-to-noise ratio (SNR), by virtue of an antenna array whose gain more than compensates for the added thermal noise that accompanies such wide IBW. The optical approach may enable the array's entire field of regard (i.e. its full beam steering range) to be continuously detected and processed in real time.

Optical image formation and engineered spectral dispersion may be used to acquire multiple k-space projections of the RF scene. Optical upconversions of RF signals by high performance modulators enables the use of simple, inexpensive optical components to perform correlations among the signals received by the array elements. For the IBW and resolution (in both frequency and AoA) provided with this approach, such correlations would be intractable using a conventional approach based on downconversion, channelization, A/D conversion and computational correlation. For example, 8-bit digitization of 100 spectral channels, each 100-MHz wide and together spanning 10 GHz, for 1000 simultaneous spatial directions (array beams) requires 20 TB/s of data throughput, not to mention the computational burden of analyzing all that data in real time, nor the sheer size and scale of 1000 parallel channelized receivers.

The optical approach may include the following: RF signals are received by antennas 120 that feed modulators 130, which upconvert the signals onto optical carriers conveyed by fibers 140. The sidebands are launched into free space as a composite optical beam 160 through an output fiber bundle that replicates the arrangement of antennas 120 in the array, at reduced scale. In this way the optical output of the bundle comprises a scaled replica of the RF field incident on the antenna array aperture. In some embodiments, the output of the fiber bundle need not replicate the arrangement of the antennas 120. Simple optical lenses and a camera (focal plane array of detectors 190) can then be used to capture the interference pattern of the composite optical beam 160, from which an optical image of the RF scene may be obtained (i.e. a map of the AoA and amplitude of any and all RF emitters sensed by the antenna array 120). The optical image of the RF scene may be obtained with straightforward computational processing. To add frequency determination to this imaging capability, the lengths of the output fibers are made unequal, so as to introduce a controlled chromatic dispersion (e.g. linearly ramping the length across the array, which is effectively an RF diffraction grating, or implementing lengths that have no correlation (e.g., may be random lengths) across the array), spreading the frequency content of the signals out in the image seen at the camera. Alternatively, or in combination with making the lengths of the optical fibers unequal, the spreading of the frequency content may be achieved by distributing the antennas in a non-coplanar configuration. This spreading of the frequencies mixes the spatial and spectral information about a signal in the image. The modulator outputs may be split into multiple fibers, and multiple output fiber bundles may be used to form multiple images. Each output fiber bundle may contain a different distribution of the fiber lengths, by which each corresponding image represents a different projection of the full spatial-spectral scene.

The most appropriate conceptual framework for understanding this process is k-space. Every RF signal incident on the array can be characterized by a wavevector k, also called a k-vector. K-space is just a uniform equivalent of an abstract space comprised of up to 2 dimensions of AoA (azimuth and elevation) and 1 dimension of (temporal) frequency. Recalling that the magnitude of the wavevector is directly related to frequency according to $2\pi f = ck$, one can readily see that frequency and AoA represent a set of spherical coordinates spanning k-space. Thinking in terms of wavevectors, rather than AoA and frequency, we are free to analyze the scene using other coordinate systems, e.g. Cartesian: $\{k_x, k_y, k_z\}$. Each of the multiple images can be interpreted as a different projection of the full k-space. For example, when all fiber lengths are equal, this corresponds to a projection onto the aperture (x-y) plane, which is insensitive to $k_z$, as shown in FIG. 4. Variation of the lengths provides different projections. As in tomography in real (position) space, which builds 3D images of the interior of structures by combining multiple projections, computational reconstruction techniques can be used to build the full k-space distribution of RF emitters from the multiple projections. From this k-space "scene," the frequency and AoA of each individual emitter can be extracted.

Analysis and simulations show that with this approach, received signals' carrier frequency can be determined to ≈100 MHz or better, depending on the variation of the lengths of the fibers and signal-to-noise ratio, and this can be accomplished simultaneously for multiple signals at widely disparate frequencies, while simultaneously providing AoA as well. The precision of the AoA determination depends on the ratio of the carrier wavelength to the overall aperture size, as well as SNR: as an example, in the low-noise limit, <1° accuracy can be obtained with a 6-cm array aperture at 18 GHz.

Generalization of Imaging Receiver

The disclosed imaging receiver may be in accordance with one or more of the following features:
  Allowing variation of the fiber length amongst the different optical channels.
  Allowing multiple optical fibers per antenna.
  Allowing arbitrary geometry of the fiber array, not necessarily linked to the geometry of the antenna array.
  Allowing the geometry of the antenna array not to be flat (2D); antennas in the array may be distributed in three dimensions, for example following a contour of a curved surface.
  Computational reconstruction of the RF scene that includes extracting both the angle of arrival and frequency of the incoming RF radiation.

The interference pattern produced by light emanating from the optical fibers may no longer correspond directly to the RF scene. Instead, the following general relation holds between the RF sources and the detected optical powers $$P_n = a_n \cdot S \quad (1)$$

where $a_n$ is a (abstract) vector corresponding to the n-th optical detector, S is a (abstract) vector corresponding to the distribution of sources in the k-space, i.e. the RF scene, and $P_n$ is the power detected by the n-th detector.

Expression (1) can be manipulated to obtain the following equivalent forms $$P_n = \Sigma a_{nm} S_m$$

$$P = AS \quad (2)$$

where the first of Eqs. (2) explicitly shows the summation of the dot product in Eq. (1) whereas the second of Eqs. (2) shows a compact notation involving matrix multiplication of (sought) vector S by matrix A to obtain the measured vector P of detected optical intensities. In Eq. (2), matrix A is determined by the details of the imaging receiver that include the geometry of the antenna array, the geometry of the fiber array, and the lengths of the fibers, as well as any additional optical phases applied to the optical signals conveyed by the optical channels. Vector S describes the RF scene in k-space, i.e. the frequencies (or frequency distributions), angles of arrival and intensities of the RF sources whose signals are received by the antenna array. Vector P comprises the intensities measured by the photodetectors. Hence, the reconstruction of the RF scene based on detected (measured) optical intensities P may require the 'inversion' of the relation Eq. (2). Since matrix A may in general be rectangular (not square) and/or singular, such 'inversion' may not be well defined in general. In this case, an approximate, and 'most likely' vector S is sought that satisfies Eqs. (2) or Eq. (1). Note also that in Eq. (2), finding the left inverse of matrix A would be sufficient to reconstruct the scene.

There exist a variety of methods that can be used to find S that satisfies, or approximately satisfies, Eqs. (2) or Eq. (1) given measured/detected P. For example, methods used in computed tomography may be employed that include the algebraic reconstruction technique (ART) also known as Kaczmarz method, or its multiplicative version (MART), or their more sophisticated flavors known to those skilled in the art. Such methods may maximize the entropy, or the relative entropy, or Kullback-Leibler divergence, of the reconstructed RF scene, or, in other words, may find the most likely distribution of RF sources (frequencies, intensities and angles of arrival of the received waves) that would result in the detected values of P. Also, 'inverting' a relation akin to that of Eq. (2) is encountered in compressive-sensing reconstruction. Therefore, methods used in that field may be applicable here.

To facilitate and speed up the reconstruction of RF scenes, a look-up table can be constructed by, for example, direct sensing of known scenes which can be augmented by computational processing using known tomography techniques, as described above, on selected matrix entries as necessary. The look-up table may receive inputs comprising one or more pixel coordinates corresponding to the location(s) of detected light by the photodetector 190. Based on receiving these pixel coordinate inputs, the look-up table may output one or more k-space vectors, each k-space vector identifying the frequency and AoA of a corresponding RF source of the RF scene. In some examples, the look-up table may also receive input(s) of the intensity of the detected light by the photodetector corresponding to each of the one or more pixel coordinates and output k-space vector(s) based on such intensity input(s).

Figure 6:
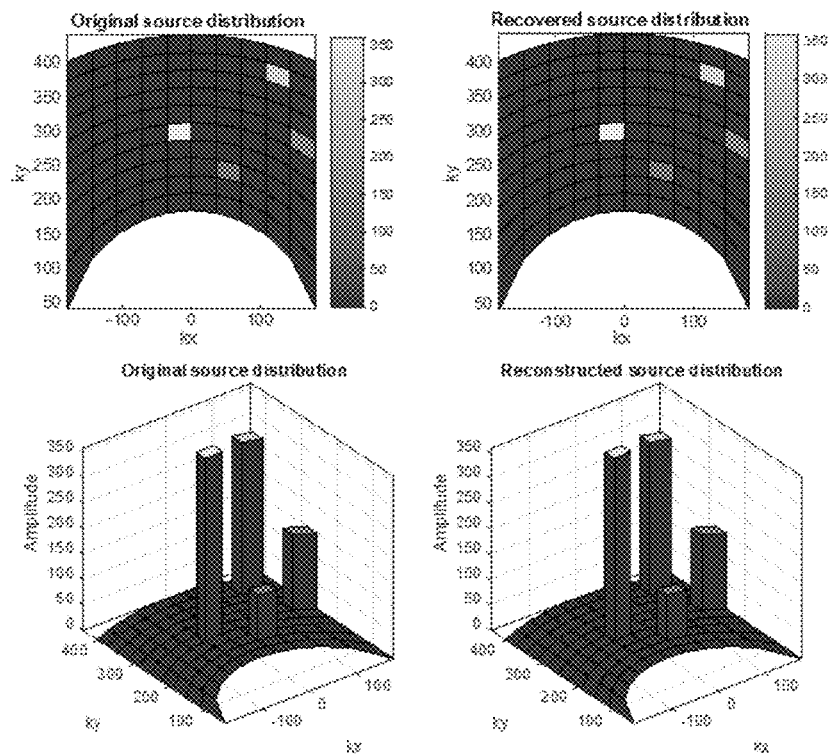
FIG. 6 is a graphical representation of RF scene reconstruction, according to certain exemplary embodiments.

FIG. 6 shows an example of RF scene reconstruction using a linear array with randomized antenna position and a random distribution of fiber lengths. On the left is the original (input) distribution of four RF sources present in the scene as represented in k-space. On the right is the reconstruction of the scene by inverting relation (2). Excellent reconstruction fidelity is accomplished in this case.

Figure 7:
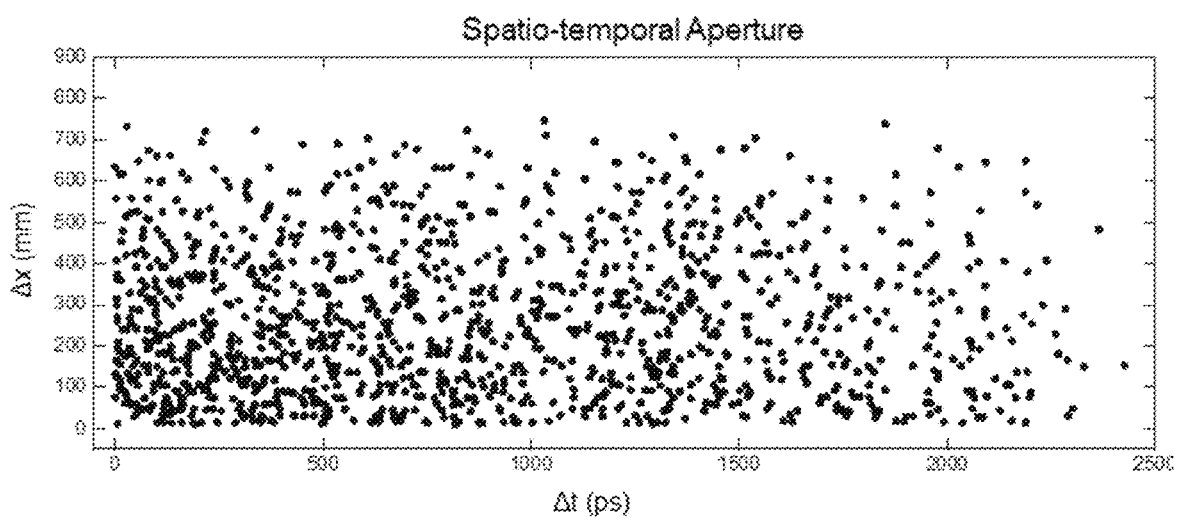
FIG. 7 depicts the sampling of the spatial-temporal aperture used in the reconstruction of FIG. 6, according to certain exemplary embodiments.

FIG. 7 shows the distribution of baselines used in the reconstruction of FIG. 6. The baselines are provided by the fiber-length differences (Δt) and by the separations in the x-direction (Δx) of the antennas in the array.

The above describes the general mode of operation of the cuing receiver. There may be other modes of operation that may relax the computational burden of extracting the information about the RF scene. Below, examples of some of such modes of operation are described in some detail.

Homothetic Arrays

Figure 2D:
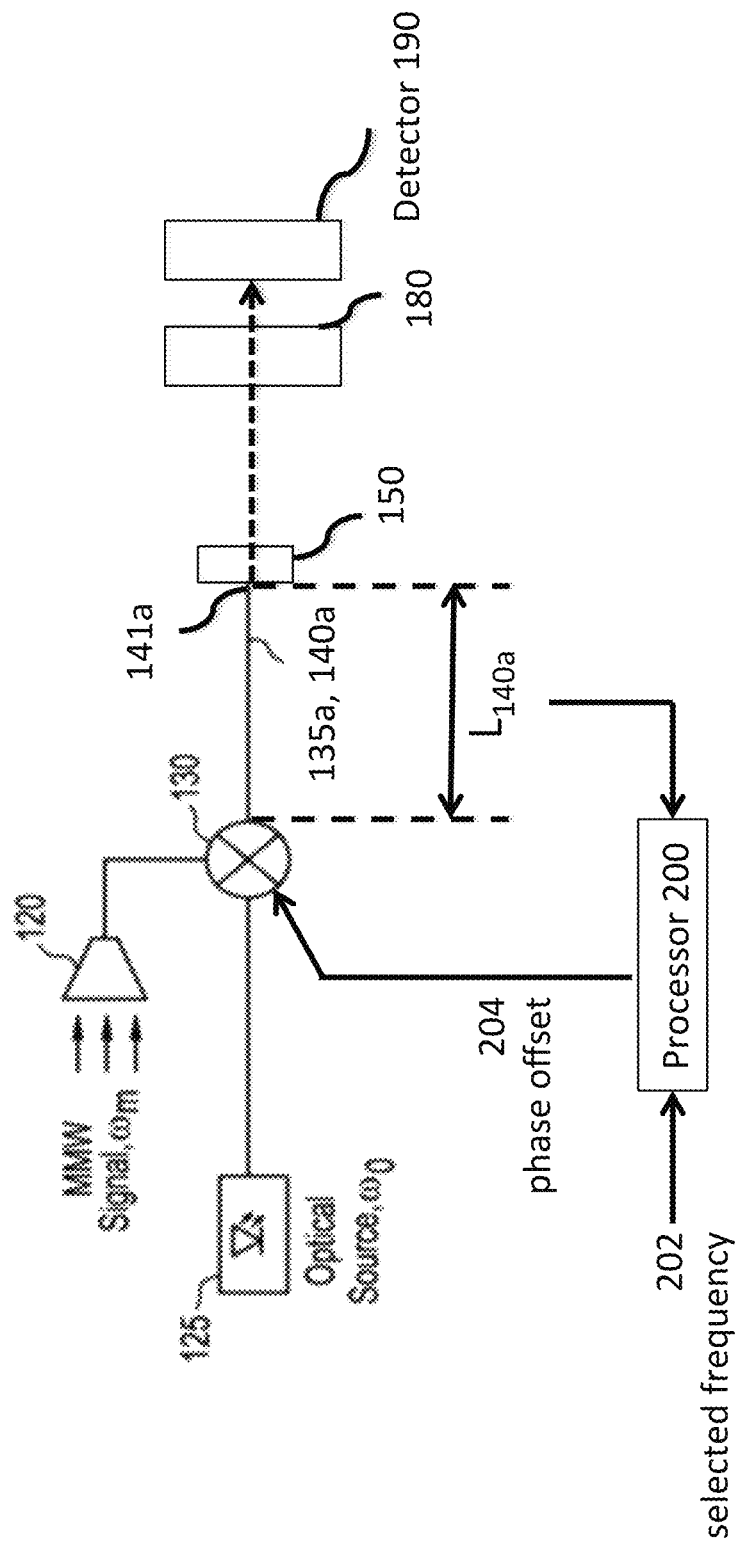
FIG. 2D illustrates details of an embodiment where the detector may capture in real-time an image of a selected frequency of an RF scene, according to certain exemplary embodiments.

FIG. 2D illustrates details of an embodiment where the detector 190 may capture in real-time an image (still image and/or video image) of a selected frequency of the RF scene with non-selected frequencies being effectively filtered and treated as noise by the detector 190. In this example, one fiber per antenna may be used and the geometry of the fiber array bundle at lenslet 150 (at the ends 141 of the optical fibers 140) may be a scaled version of the antenna array 120. For example, the ends 141 of the optical fibers 140 may have the same relative physical arrangement as the arrangement of the antenna array 110. For example, a projection of the antenna array 110 onto a plane may have the same relative arrangement as the arrangement of the ends 141 of optical fibers 140 corresponding to the connection of such optical fibers 140 to the associated antennas 120 of the array 110. The same relative arrangement may include the same relative spacing, same relative order and/or same relative locations with respect to neighboring fiber ends 141.

As shown in FIG. 2D, a phase offset 204 is applied to optical modulator 130 by applying a constant (DC) bias voltage; to obtain optical phase delay, voltage V=(/*V is applied, where V is the half-wave voltage of the electro-optic modulator. The phase offset 204 is variable and is based on a selected frequency 202 input to the processor 200 and on the (optical) length of the optical fiber 140a. The processor 200 outputs an appropriate phase offset 204 for each of the modulators 130 of the imaging receiver 100 to compensate for the phase delay the RF signal would experience when traversing the distance $L_{140a}$, which is equal to $m*L_{140a}/c$ where $_m$ is the selected RF frequency 202, $L_{140a}$ is the optical length of the fiber 140a (time delay multiplied by the speed of light) and c is the speed of light. Note that the applied optical phase offset to cancel the accrued RF phase delay need only be applied modulo 2. Since the phase delay, $m*L_{140a}/c$, of the RF signal is an explicit function of the selected frequency 202, $_m$, the applied optical phase compensation provides phase cancellation only for that selected RF frequency. Similarly, different optical lengths $L_{140a}$ require different optical phase compensations.

With these phase offsets applied to each of the modulators 130, despite the different lengths of the optical fibers 140, the upconverted optical signals corresponding to the selected RF frequency remain in proper phase relations at the outputs 141 of the optical fibers 140 for the optical interference (e.g., constructive and destructive interference) in the composite beams 160 and 185 to reproduce the RF scene at this selected RF frequency as an optical image on the detector 190 (as still and/or video image). This way, the image projected onto and detected by the detector 190 corresponds to the RF scene of the selected RF frequency received by antenna array 110. However, optical signals corresponding to RF frequencies outside this selected RF frequency will exit the optical fiber bundle without compensation for the phase differences caused by the different lengths of the optical fibers 140 in the optical fiber bundle and thus will be distributed across the detector 190 and appear as noise to the detector 190.

With the phase compensation as described with respect to FIG. 2D, the RF scene at the selected RF frequency is faithfully reconstructed in the optical domain, i.e., the interference pattern generated by the overlapping optical beams emanating from the fiber array corresponds to the RF scene at the selected frequency, plus distributed background (fixed-pattern 'noise') due to sources operating at other frequencies. As such, little or no additional (computational) processing is needed to determine the angle of arrival of waves at this frequency. Sources operating at frequencies different than the selected one contribute to the detected power, but their contribution is, in general, spread over multiple detectors. As a result, the contribution of such sources to the signal at any selected photodetector corresponding to a particular angle of arrival would be suppressed as compared to the frequency the receiver is 'tuned to.' Such contribution from out-of-band sources may be further suppressed by applying spectral filtering at the RF front end, i.e. before the up-conversion of the received RF signals to optical domain. Also or alternatively, optical filtering to suppress the contribution from out-of-band sources may be used.

In the exemplary implementation above, optical fibers with varying lengths were utilized. However, other means for effecting phase variation can be utilized. For example, true time delay lines—either adjustable or fixed—can be utilized to introduce length variation. Adjustable time delay provides the benefit of adjusting or fine tuning system operation on the fly.

The selected RF frequency 202 at which faithful optical reconstruction takes place (detected as an image by detector 190) may be selected by a user based on certain RF frequencies of interest and/or automatically changed rapidly by applying suitable bias or phase offset to the modulators. Hence, the received frequency may be scanned to reconstruct the distribution of RF sources in the k-space, i.e. finding the frequencies, intensities and angles of arrival of the received electromagnetic waves.

Multiple Independent k-space Projections

Figure 8:
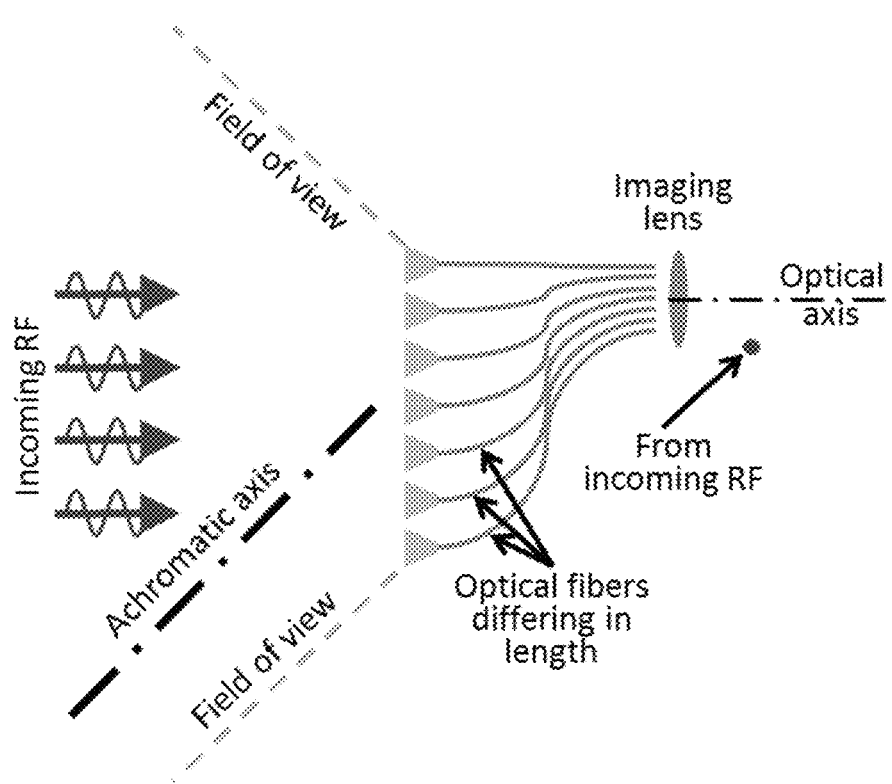
FIG. 8 is a schematic drawing illustrating an imaging receiver arranged so as to receive off-axis incidence for all received RF radiation, according to certain exemplary embodiments.

As indicated in FIG. 4, equal fiber lengths in combination with homothetic arrays yield a particularly simple projection of the k-space in the optical reconstruction. On the other hand, purely random selection of fiber lengths yields projections of the type indicated in FIG. 5. By choosing the fiber lengths to vary linearly with the position of the antenna in the array, and homothetic arrays configuration, the projection of the k-space that deviates from that of FIG. 4, but one that is less complex than that of FIG. 5 may be obtained. Such a cuing-receiver configuration is shown in FIG. 8. One can think of such configuration as receiving all incoming RF radiation on one side of the achromatic axis.

As an example, in FIG. 8, the optical-fiber length corresponding to the antenna element at the top of the array is shorter than the optical fiber-fiber length corresponding to the element at the bottom. (It is noted that the fiber-length differences in FIG. 8 are shown for illustration purposes only, and may be considerably different in an actual implementation of the system.) As a result, an RF wave incoming along the line labeled in FIG. 8 as "Achromatic axis" would produce an optical wave-front parallel to the optical axis of the imaging lens, had it not been outside the field of view. On the other hand, the wave labeled as "incoming RF" would produce a spot off axis as shown in the figure.

Figure 9:
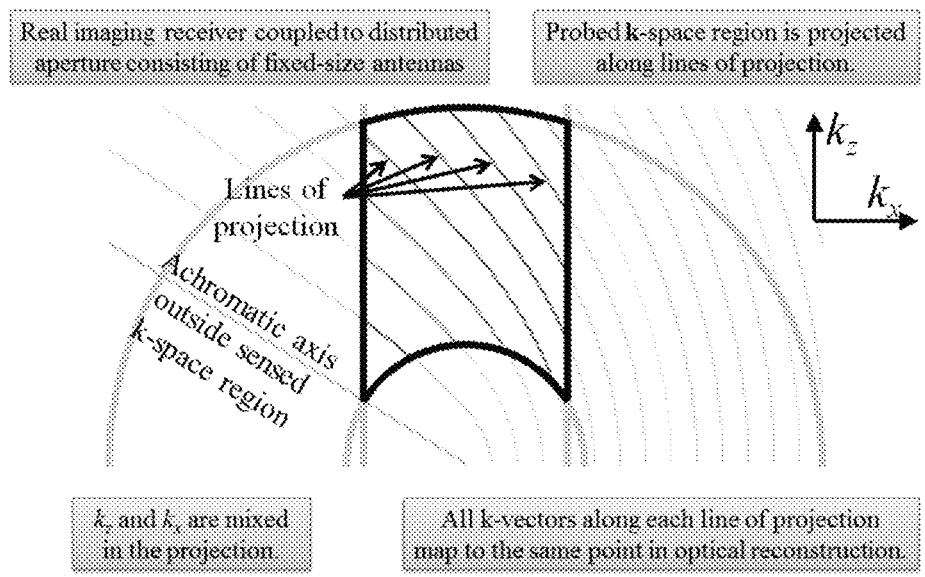
FIG. 9 depicts the projection of k-space in the receiver configuration of FIG. 8, according to certain exemplary embodiments.

The manifestation of such receiver configuration in k-space is shown in FIG. 9. Compared to the configuration of equal-length fibers of FIG. 4, the projection lines are tilted in the k-space. As a result, mixing of the angle of arrival and frequencies occurs in the light distribution detected by the photodetector array. It is also possible to configure the array in such a way that the RF imaging axis (achromatic axis) falls outside the field of view of the antenna elements as shown in FIG. 8. Note that the field of view is determined by the acceptance angle of the individual elements of the antenna array.

Figure 10:
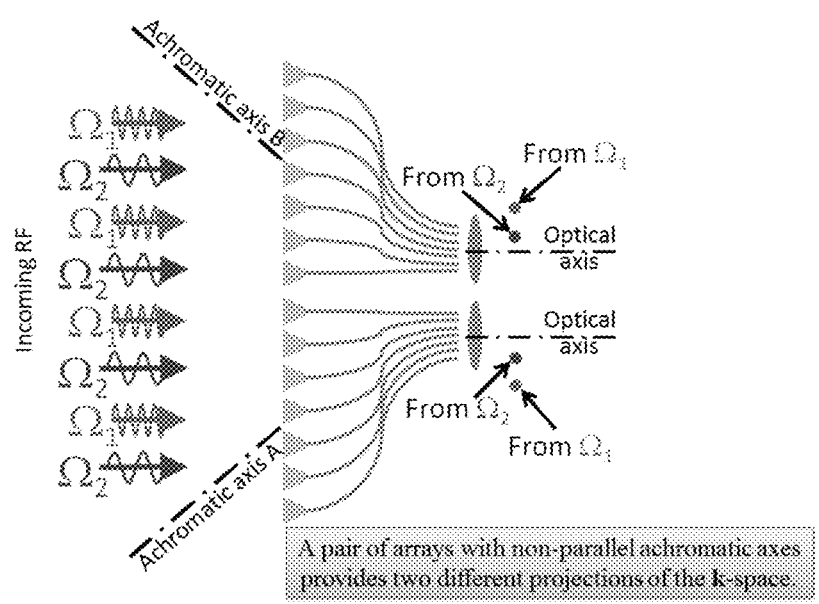
FIG. 10 is a schematic drawing illustrating a combination of two off-axis imaging receivers for AoA/frequency disambiguation, according to certain exemplary embodiments.

Combining two receivers with different RF imaging axes, as in FIG. 10, yields two images of the same RF scene with different frequency-dependent shift in the optical reconstruction: Note that for the same two RF sources operating at frequencies $\Omega_1$ and $\Omega_2$, the image of source 1 is shifted down with respect to source 2 in imager with RF axis A, whereas it is shifted up in the imager with RF axis B.

Figure 11A:
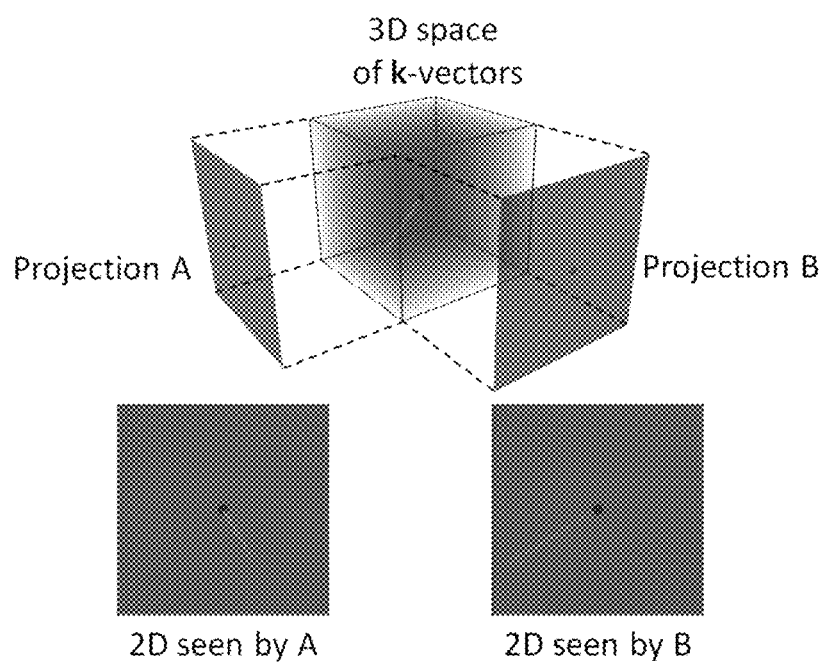
FIG. 11A is a schematic drawing illustrating a visualization of 3D k-vector space performed by two arrays, according to certain exemplary embodiments.

In an abstract sense, the use of two arrays with different RF imaging axes can be visualized with the help of FIG. 11A. The 3D space of propagation vectors k is projected onto two dimensions along axes A and B corresponding to the two arrays. Accordingly, two 2D images are formed in the optical domain with the 3D k-vector corresponding to an incoming RF wave represented as a 2D vector in each of the arrays. Having the two 2D projections, the original 3D k-vector can be reconstructed computationally. This way, full information of the incoming wave, i.e. the AoA and the frequency, can be recovered from the two 2D images.

Figure 11B:
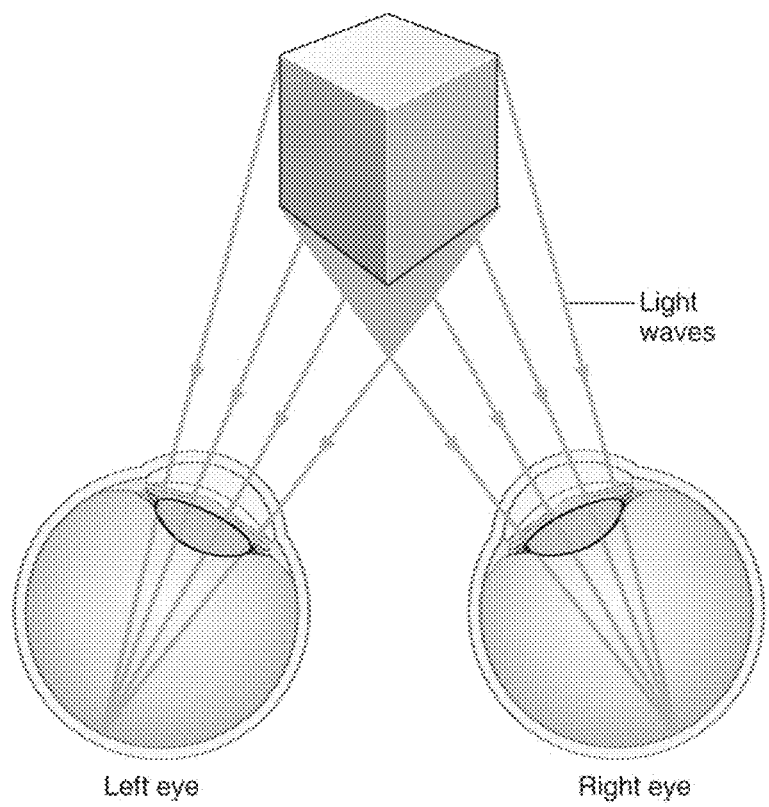
FIG. 11B is a schematic drawing illustrating a visualization of 3D real space performed by visual stereoscopic imaging, according to certain exemplary embodiments.

The reconstruction of the 3D k-vector from two 2D projections can be compared to 3D real-space stereoscopic imaging, FIG. 11B. In that case, the image projected on the retina of each eye is two-dimensional, yet a 3D representation of the scene is reconstructed 'computationally' in the brain from two such images obtained by two projections along two optical axes of the left and right eyes. Similar computational reconstruction of the 3D k-vector space is performed in exemplary implementations of our invention.

Figure 12:
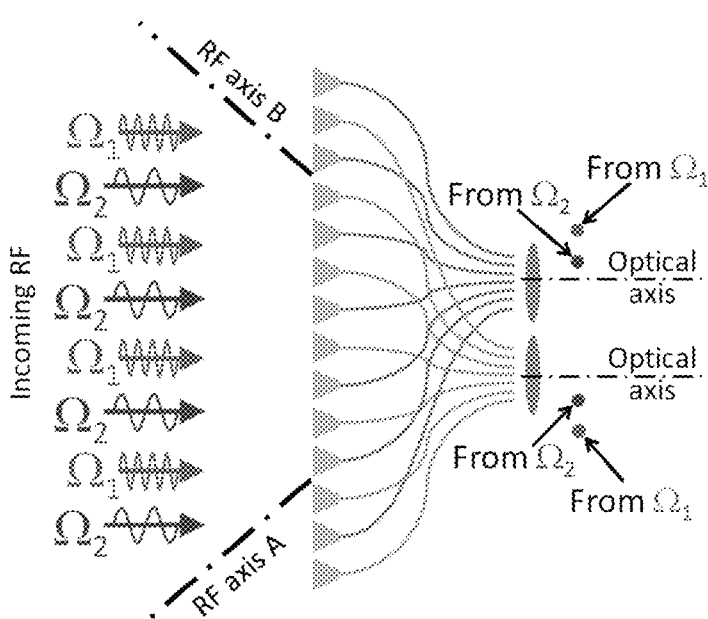
FIG. 12 is a schematic drawing illustrating a dual array for 3D k-space reconstruction with interleaved arrays, according to certain exemplary embodiments.
Figure 13:
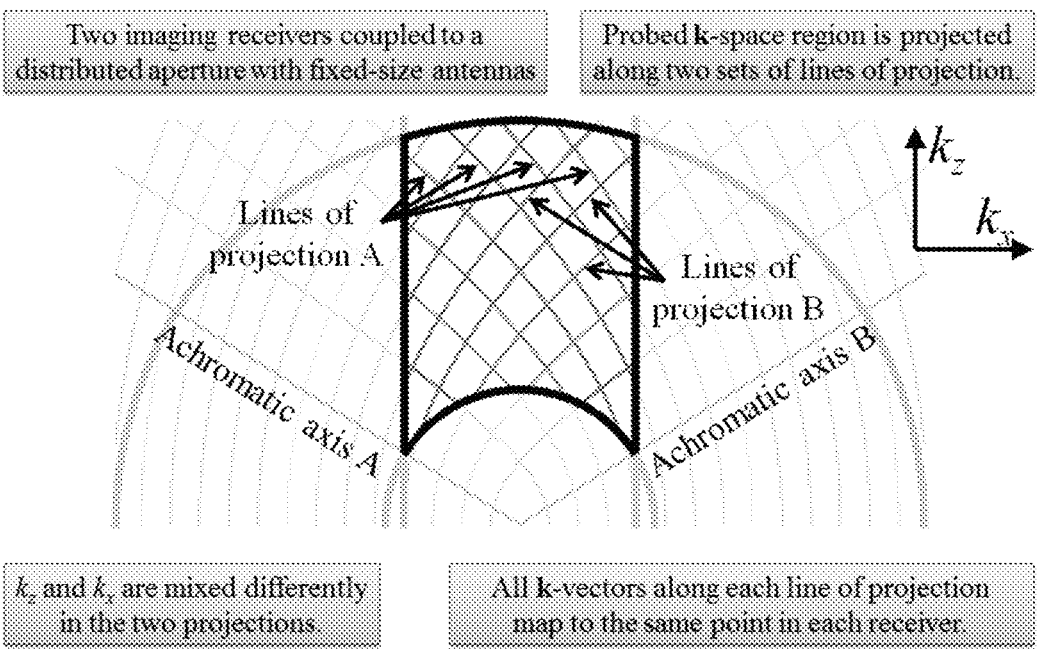
FIG. 13 depicts k-space representation of stereoscopic imager with two sets of lines of projection, according to certain exemplary embodiments.

FIG. 13 is another illustration of the two projections of k-space. Two sets of projection lines are present, each set corresponding to one of the achromatic axes, see FIG. 12.

Although the 3D k-space reconstruction of the exemplary implementations are conceptually similar to the stereoscopic vision described above, there may be differences between these two cases. Whereas stereoscopic vision applies to imaging objects in real space, our system may apply to k-space—the space of k-vectors corresponding to plane waves. As a result, for the stereoscopic vision to be effective, the two parts of the imaging system must be offset spatially, as in the familiar Left-eye/Right-eye configuration of FIG. 11B; this is how the imaging axes are made non-parallel, and each eye presents a different view of the same subject. In contrast, since the imaging receiver performs projection in k-space, the two antenna arrays of the imaging receiver in FIG. 10 can be co-located as long as they present different imaging axes by, for example, properly choosing the optical fiber lengths.

The ability to co-locate the two arrays can be taken advantage by interleaving the antenna placement as in FIG. 12. This configuration can be thought of as consisting of a single antenna array with fibers collected in two separate bundles to form two optical images; each of the fiber bundles carries RF signals from antenna elements scattered throughout the array. The fiber lengths for each of the bundles are chosen so as to yield RF axes A and B, FIG. 12, similar to the RF axes of the two spatially-separated arrays of FIG. 10.

Figure 14:
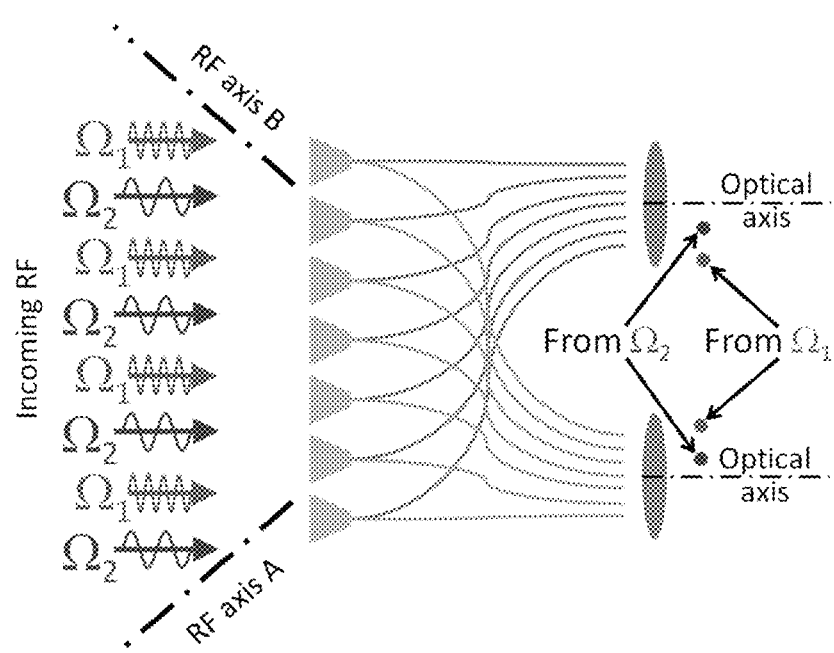
FIG. 14 is a schematic drawing illustrating a single array with two RF imaging axes, according to certain exemplary embodiments.
Figure 15:
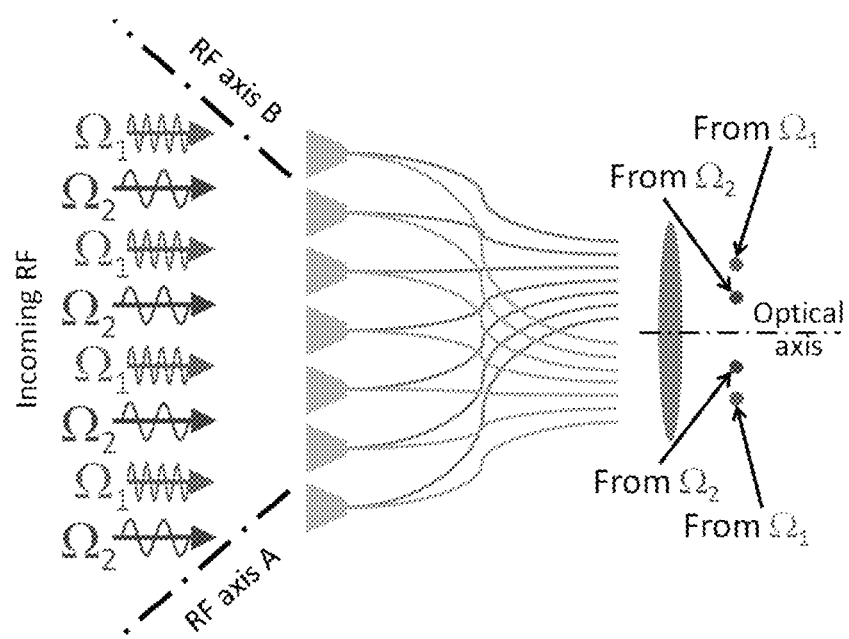
FIG. 15 is a schematic drawing illustrating a dual imaging receiver with shared optical reconstruction system, according to certain exemplary embodiments.

The idea of co-locating the two arrays can be implemented as shown in FIG. 14 where a single antenna array is present. The modulated optical output of each antenna element is split into two, and the resulting two sets of fibers are collected into two fiber bundles to reconstruct two optical images. The lengths of the fibers in each of the bundles are chosen so as to produce different RF optical axes, labeled as RF axis A and RF axis B in FIG. 14. As a result of having originated from two different RF imaging axes, the two optical images correspond to two different projections of the 3D k-space, as explained in FIG. 11A, and therefore provide means to reconstructing the AoA and frequency of received RF waves.

For imaging receivers configured in such a way that the RF imaging axes fall outside the field of view of individual antennas, the system can be further simplified by combining optical reconstruction. Since the k-vector of the received incoming RF wave always falls to one side of the RF imaging axis, the resulting optical image will fall to one side of the optical axis. As a result, the two optical images form on the opposite sides of the optical axis. This allows combining the two optical systems into one where half of the image corresponds to the projection of the k-space along RF axis A, and the other half corresponds to the projection of the k-space along RF axis B.

The disclosed exemplary implementations may resolve the ambiguity in the angle of arrival (AoA) of electromagnetic radiation at the position of a distributed aperture. In addition, it provides information about the frequency of received radiation. The exemplary implementations may do so within the framework of imaging receiver concept wherein the incoming RF is up-converted to optical domain in the front end, i.e. at the individual antenna elements that constitute the receiving array, and conveyed with optical fibers to central location for processing.

The exemplary implementations allow the use of relatively slow photo-detector array for detector 190, one that need not respond at the RF frequencies received, to extract information about the RF source location (AoA) and the transmitted frequency. Although the disclosed exemplary implementations will also operate with the use of a relatively fast photo-detector array for detector 190, it is not necessary and may constitute a wasted extra expense. As described herein, each of the plural fiber optic bundles may have their optical outputs 141 imaged by the same detector 190 simultaneously or may each have their optical outputs 141 imaged by a different detector 190. In addition, the plural optical bundles may have their optical 141 outputs imaged separately and sequentially (e.g., rapidly switch the optical outputs 141 of each optical bundle on and off to detect the optical outputs at different times by detector 190). This latter implementation may be helpful when attempting to resolve ambiguities in analysis of certain optical patterns detected by detector 190 of the combined optical outputs 141 of plural fiber optic bundles onto detector 190.

To the best of our knowledge, prior to this invention, there was no way to resolve the frequency/AoA ambiguity within the imaging-receiver framework, absent post-detection (using fast photo-detector(s)) electronic processing to determine the incoming frequency.

The exemplary implementations may unambiguously pinpoint the location and frequency of an RF source with the imaging receiver.

The implementation of the general imaging receiver may require intensive computation to achieve faithful reconstruction of the RF scene. On the other hand, the use of 'stereoscopic' reconstruction with multiple projections of the k-space may in some circumstances lead to ambiguous reconstruction. For example, if multiple RF sources are transmitting simultaneously in the scene, there remains the possibility of assigning incorrect AoA and frequency in some circumstances. Such possibility can be related to the stereoscopic vision, compare FIG. 11B, which in most cases is sufficient to faithfully reconstruct a 3D scene, but allows optical illusions in some circumstances, with false impression of object placement and/or orientation in the scene.

This disadvantage can be overcome by increasing the number of arrays simultaneously trained on the scene (e.g., three or four or more arrays), with each array presenting a different RF imaging axis. Each additional array introduces additional constraints on the coincidental placement of RF sources and their frequencies that could lead to ambiguity. Therefore, each additional array reduces the likelihood of such a coincidence happening. Such arrangement can be compared to tomography where a series of projections at various angles, a computer-tomographic (CT) scan, allows the 3D reconstruction in real space. Since our invention relates to k-space, such reconstruction can be referred to as k-space tomography in our case. The reduced ambiguity is at the cost of increased computational complexity to reconstruct the RF scene.

Figure 16:
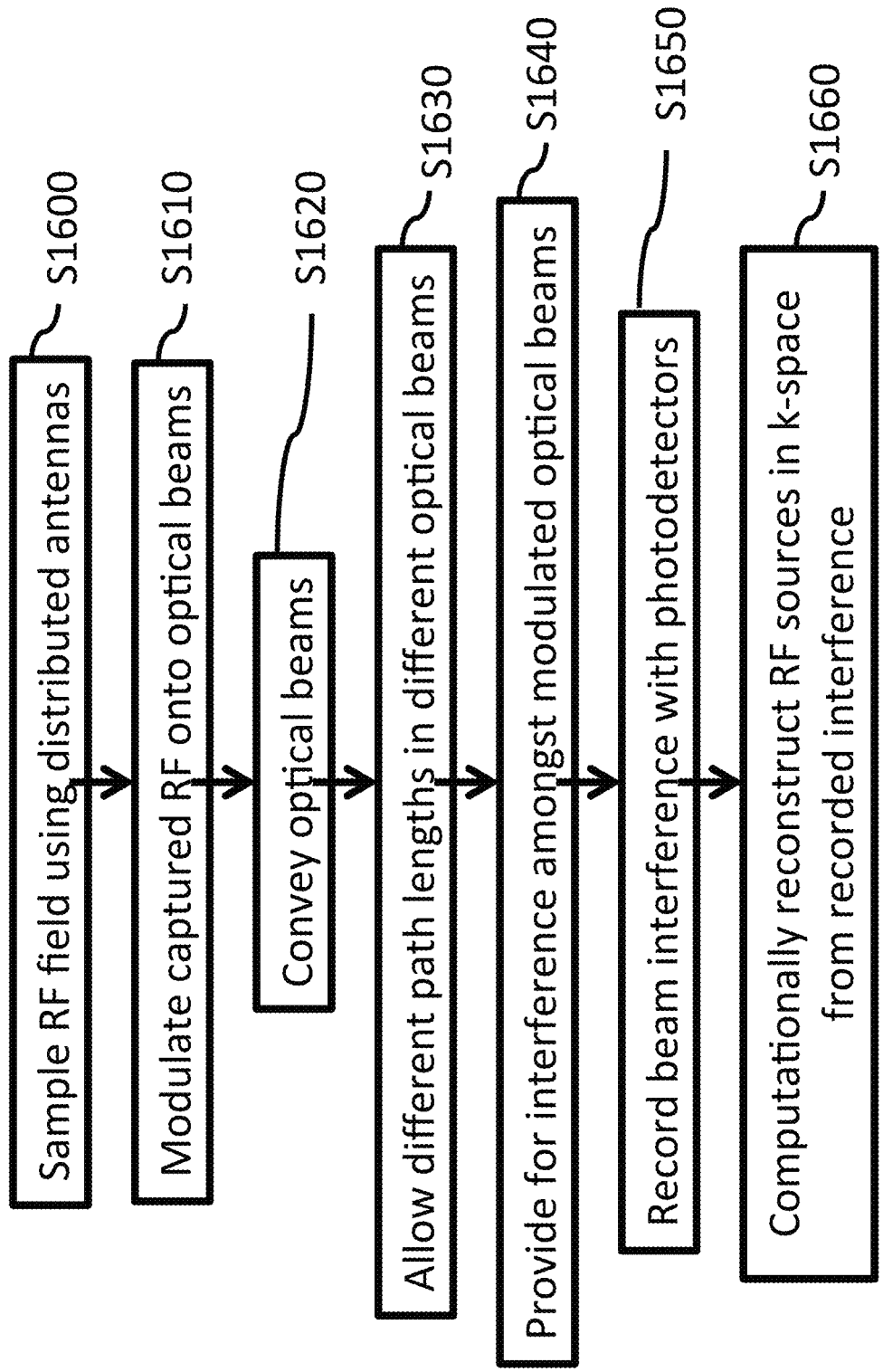
FIG. 16 is a flowchart of a method performed by an imaging receiver, according to certain exemplary embodiments.

FIG. 16 is a flow chart of a method performed by an imaging receiver configured in accordance with the disclosed exemplary implementations and FIGS. 1, 2A-C. In S1600, sampling of the RF signal field received at distributed antenna arrays is performed. In S1610, the sampled RF signals are modulated onto optical beams, and in S1620 the modulated signals are conveyed by, for example, optical fibers having varying lengths in accordance with S1630 so as to generate interference patterns amongst the modulated optical beams in S1640. The optical beam interference is recorded by photodetectors in S1650 and computational reconstruction of the RF signals in k-space is performed in S1660 using known techniques.

Figure 5:
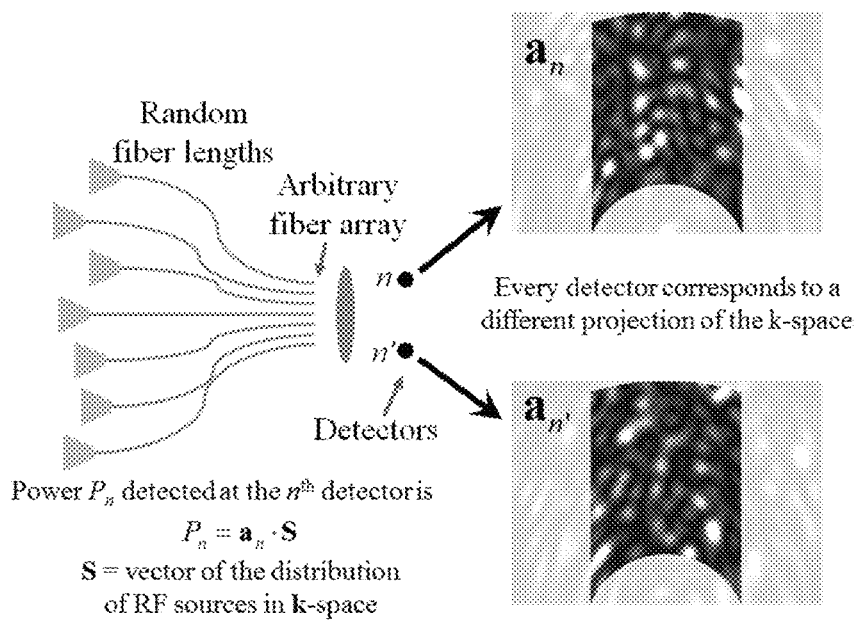
FIG. 5 is a schematic drawing illustrating of a generalized imaging receiver, according to certain exemplary embodiments.

One way of providing the different path lengths, per S1630 in FIG. 16, is by using optical fibers having varying lengths carrying the modulated optical beams to the photodetectors for each optical beam. In one exemplary implementation, the length of the fibers varies linearly in accordance with its position at the antenna/modulator array. An alternative methodology would be to use different configurations for the fiber array as compared to the antenna array. Another alternative would be to use arbitrary, e.g. random, fiber lengths as illustrated in FIG. 5. The range of fiber lengths may affect the spectral resolution of the obtained reconstruction of the RF scene. Thus, the spectral resolution may be determined by the largest difference in fiber length in accordance with well-known scientific principles. For example, if the largest fiber length difference leads to the relative delay between respective optical signals of 1 ns, then the spectral resolution, i.e. the ability of the system to distinctly resolve RF sources emitting at adjacent frequencies, may be about $2*(1\ ns)^{-1}=2$ GHz. The practical path length variations implemented in optical fiber may range between 0.5 mm and hundreds of meters.

K-Space Projections in RF Domain

In alternative embodiments, conversion of the RF (radio frequency) radiation detected by the antenna array 110 to the optical domain may be avoided, with the detector 190 of FIG. 1 replaced with a plurality of RF detectors (or electrical power detectors). In the k-space receiver described above, the interference module (the interference module is the structure of FIG. 1A between the antenna array 110 and photodetector array 190) is implemented with an optical channel where the RF signals detected by antennas 120 are converted to light, and subsequent time delays and cross-coupling (mixing, interference) of the received signals is performed in optical domain. In the below described alternative embodiments, the interference module is implemented in the RF domain. Although these alternative embodiments implement the interference module in the RF domain, other frequency domains may also be used to implement the interference module, such as in the acoustic domain, and the below description should be recognized to equally apply to non RF domain implementations.

The frequency of the RF radiation (detected by the antennas 120 and transmitted as an electrical RF signal) may be any radio wave frequency, including any radio frequencies from high frequency millimeter wavelength RF (30 to 300 Ghz) to low frequency (LF) (30 kHz to 300 kHz) and to very low frequency (VLF) RF (3 kHz to 30 Khz), and anything in between. Transmission loss when transmitting the RF signals from the antennas 120 may be acceptable, although lower transmission loss may be obtained as the frequency of the RF signal is made lower. For example, for RF signals frequencies below 50 GHz, transmission loss in a coax cable may be acceptable (1.44 dB/ft at 50 GHz) to implement varied delays of the transmitted RF signals prior to coupling the same in an RF coupler (as described below).

Figure 17B:
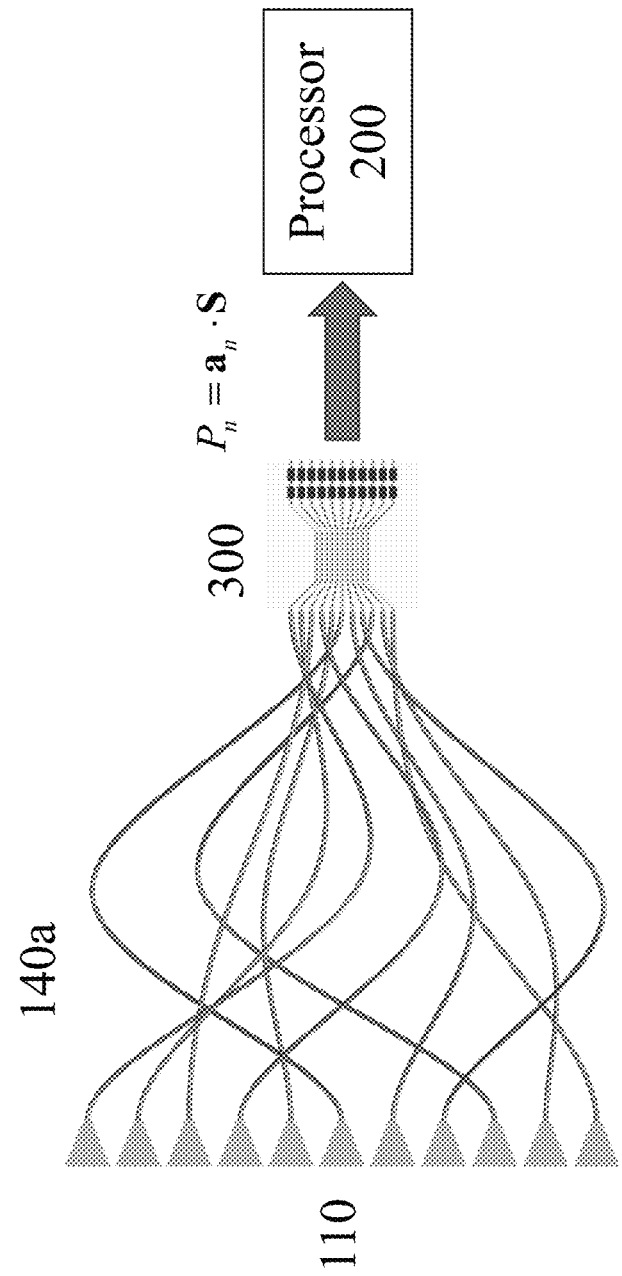

FIG. 17A illustrates an exemplary configuration where RF radiation detected by antennas 120 of the antenna array 110 are transmitted along RF waveguides 140a to RF coupler 300. After interference of the RF signals via the RF coupler 300, resultant signals are output from the RF coupler 300 and conveyed by RF waveguides 140b to a plurality of RF detectors 190a. Each RF detector 190a detects the corresponding RF signal received via one of the waveguides 140b and outputs an electrical analog envelope signal corresponding to the power of the received RF signal. The plurality of analog envelope signals are provided by wiring 190c to corresponding analog to digital converters 190b. Analog to digital converters 190b convert each of the received analog envelope signals to a corresponding digital value that are subsequently transmitted to processor 200. An analog to digital converter 190b may be provided for each analog envelope signal output by the RF detectors 190a, or an analog to digital converter 190b may be shared by several of the RF detectors 190a by providing plural analog envelope signals to a multiplexer (not shown) which is then controlled to select and sequentially transmit each of the input analog envelope signals to the shared analog to digital converter.

Processor 200 may perform the same processing as described herein, such as determining the k-space information of one or more RF sources in the RF scene (i.e., the angle of arrival, which may be expressed as, e.g., azimuth and elevation, and frequency of one or more RF sources in the RF scene). K-space information of the RF sources/RF scene may be processed and provided in real time by the antenna array, the interference module (including waveguides 140a and RF coupler 300 in this example), RF detectors 190a, analog to digital converter 190b and the processor 200. Depending on the RF waveguides used, the frequency of operation of this embodiment may be limited compared to the optics-based approach due to propagation losses in the RF waveguides (which increase as the frequency is increased). However, bypassing optics reduces the complexity of the system, and therefore its cost, while its simplicity may help improve reliability.

In some examples, the RF signals detected by antennas 120 may be downconverted to a lower frequency and this lower frequency RF signal may be transmitted and processed by RF coupler 300. The RF signal detected by antennas 120 may be downconverted by mixing the detected RF signal with a sinusoidal signal provided by a local oscillator and applying a low pass filter or a band pass filter to the resultant signal to allow transmission of the lower frequency sideband. In this alternative implementation, downconversion may be performed by mixers, each interposed between the electrical RF signal output by a corresponding antenna and waveguides 140a. Such mixers may be implemented in a similar manner to that shown in FIG. 1A with respect to use of the electro-optic modulators 130 of FIG. 1A, but the mixers modulate the received RF signal output by the corresponding antenna 120 to a lower frequency electrical signal with a sinusoidal electrical signal (replacing light received via laser 125 and splitter 127 of FIG. 1A). A low pass or band pass filter may be interposed between mixers and waveguides 140a to transmit the lower frequency sideband and filter (block) a resultant higher frequency sideband.

In other examples, the RF signals detected by antennas 120 may be upconverted to a higher frequency, and this higher-frequency RF signal may be transmitted and processed by RF coupler 300. The RF signal detected by antennas 120 may be upconverted by mixing the detected RF signal with a sinusoidal signal provided by a local oscillator and applying a high-pass filter or a band pass filter to the resultant signal to allow transmission of the higher frequency sideband. In this alternative implementation, upconversion may be performed by mixers as described above for downconversion.

RF waveguides 140a in these embodiments replace the optical fibers (e.g., optical fibers 140) that transmit and emit light to form combined beam 185 (e.g., in free space) as described in the embodiments above. The lengths and spatial positioning of the RF waveguides 140a (e.g., with respect to the antennas 120 of the antenna array 110) may correspond to the lengths and spatial positioning of these optical fibers in any of the embodiments described above. Although FIG. 17A implies that the lengths of the RF waveguides 140a are the same, it will be appreciated that the lengths of the RF waveguides 140a may have varied lengths, such as described herein with respect to optical fibers. For example, the lengths of the RF waveguides may be a function of the position of the antenna 120 whose signal they transmit, such that the lengths of the RF waveguides 140a vary linearly with the position of the antenna in the array, such as described herein with respect to FIGS. 8-15. The lengths of the RF waveguides 140a may be uncorrelated, and may have a random distribution and/or a variety of lengths. Further, the spatial positions of the RF waveguides (at their output to the RF coupler 300) may not have the same relative positions of (or otherwise correlate to) the positions of the antennas 120 of the antenna array 110. For example, the lengths and spatial positions of the RF waveguides 140a may correspond to the lengths and spatial positioning described herein with respect to FIGS. 5-7. Alternatively, the lengths of the RF waveguides 140a may be the same and have a relative spatial positioning (at their output to the RF coupler 300) that is relatively the same as and/or aligns with the spatial positions of the antennas 120 (such as described with respect to FIG. 4).

Each of the optical domain embodiments (where the RF signal of an antenna is converted to a corresponding optical signal) disclosed herein may be implemented in the RF domain (without converting the RF signal to a corresponding optical signal). The details set forth above with respect to these optical domain embodiments that are applicable to the RF domain alternative implementation (e.g., waveguide lengths, waveguide spatial arrangement, signal interference and data processing) may be the same for the RF domain implementation and may not be fully repeated here.

Figure 17C:
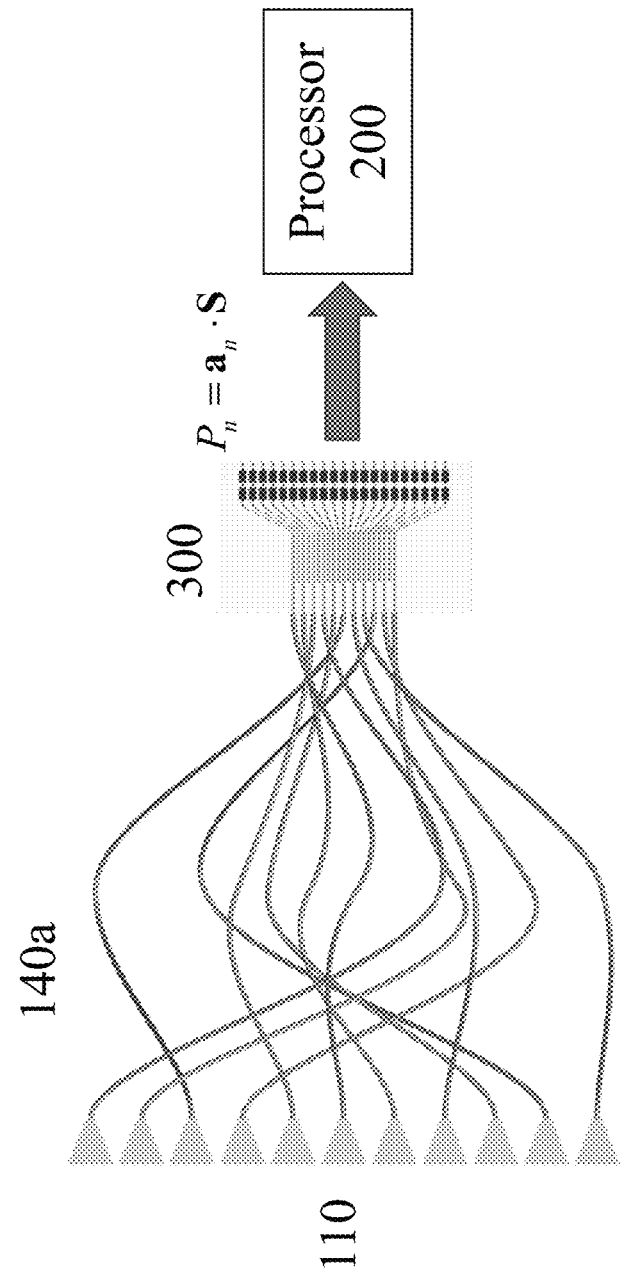

FIG. 17C illustrates an example where the lengths of the RF waveguides 140a are varied and have a spatial positioning at their output to the RF coupler 300 that is not in the same arrangement as the spatial positioning of the corresponding antennas 120 of the antenna array 110 to which the RF waveguides 140a are connected. Each of the RF waveguides 140a may be embodied as flexible wiring (for example, coaxial cables or twisted pairs of wiring) carrying an RF signal provided by the antenna 120 to which the RF waveguide 140a is connected. However, other types of RF waveguides, such as those disclosed herein, may also be used. Each of the RF signals provided by antennas 120 of the antenna array 110 may be amplified with a corresponding amplifier (not shown) that may be inserted between the antenna 120 and the RF coupler 300 (such as at the output of the antenna 120).

Figure 18A:
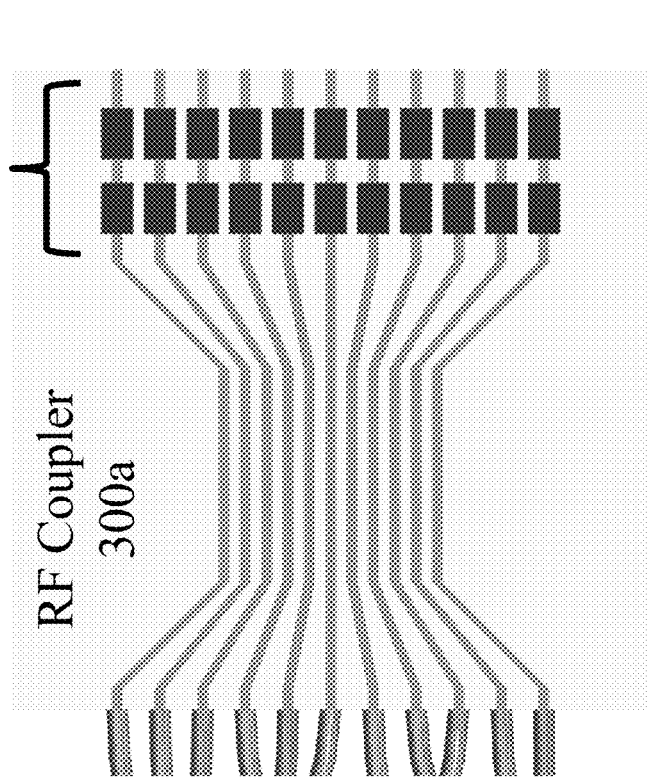
FIGS. 18A-18C illustrate example RF couplers, according to certain exemplary embodiments.
Figure 18B:
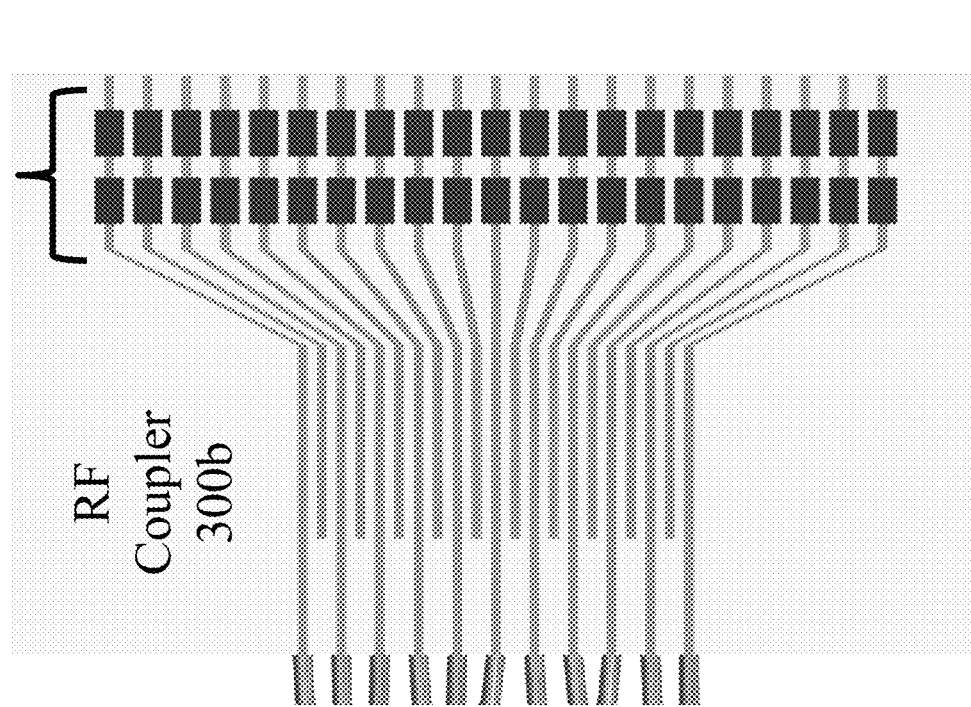
Figure 18C:
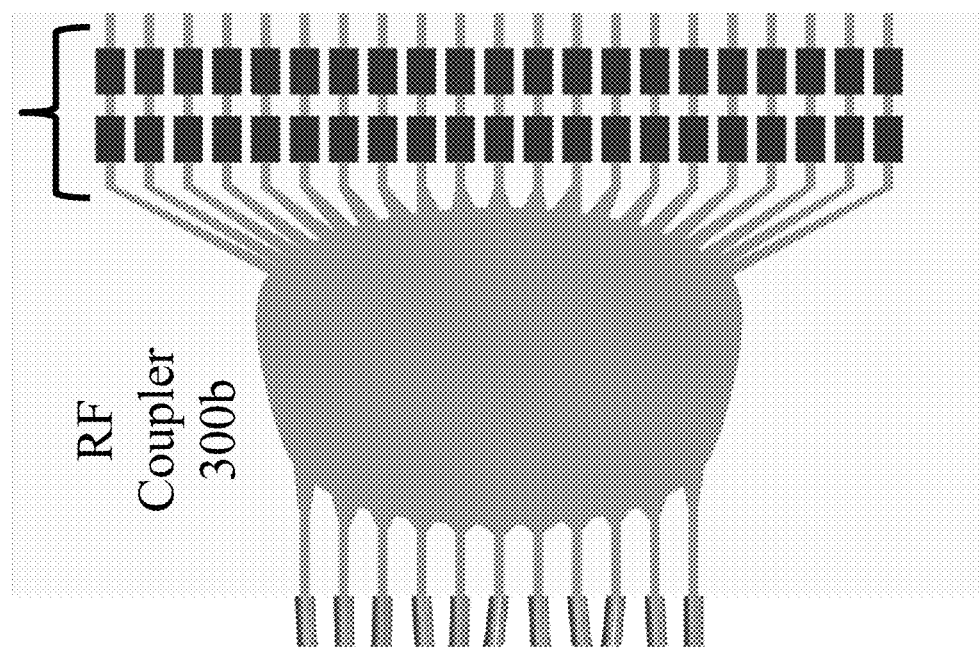

To allow interference of the RF signals from the antenna array 110, shielding of each of the RF waveguides 140a may be removed at the RF coupler 300. At the RF coupler 300, the electromagnetic field corresponding to the RF signal received from an antenna 120 and carried by the corresponding transmission line overlaps with the electromagnetic fields corresponding to the RF signals carried by other, neighboring transmission lines that similarly are carrying RF signals from different antennas 120 of the antenna array 110. Such field overlap may yield a cross-talk, or coupling, among the different transmission lines such that each of the outputs of the RF coupler 300 carries signals from multiple inputs to the RF coupler. Exemplary RF couplers 300a and 300b illustrated in FIGS. 18A and 18B provide two such examples of such structure. FIG. 18B is similar to FIG. 18A but includes additional signal wires inserted between those connected to and carrying RF signals from a corresponding one of the antennas 120, allowing such additional signal wires to receive RF radiation from the input RF signals, and output an electrical signal to RF detectors 190a. FIG. 18C can be considered an extreme case of FIG. 18A or 18B, where the signal conductors of the transmission lines are placed so close to one another as to make a physical and electrical connection, thereby forming a single electrode in the coupling region.

In some examples, shielding of the RF transmission lines of the RF waveguides 140a and/or 140b may not be necessary, so that interference may occur (either to a strong or weak degree) between the RF transmission lines as the RF signals are transmitted from the antenna array 110 to the RF coupler 300 and/or from the RF coupler 300 to the RF detector 190a. In these examples, the RF coupler 300 may "replace" one or both of waveguides 140a and 140b, although RF coupling at certain locations along the transmission of the RF signals may be weak (where the function of the structure may be more oriented to transmission rather than RF coupling).

Rather than providing a continuous transmission line between the antenna array 110 and the RF detector 190a through RF coupler 300, transmission lines of the waveguides 140a from the antenna array 110 may terminate at their input to the RF coupler 300 and resume at the output of the RF coupler 300 as part of waveguides 140b. For example, the RF signals may be allowed to radiate into free space or other medium to interfere with one another, and resultant electromagnetic signals are each received and converted into an RF signal by wiring positioned to receive the radiated electromagnetic signals (e.g., acting as antennas at a downstream location from the free space or other medium). Further discussion and exemplary details of the RF coupler 300 are set forth below.

Referring back to FIG. 17B, after the RF signals interfere with one another, the resultant RF interference pattern is detected by RF detectors 190a and converted to a digital form by analog to digital converters 190b and sent to processor 200.

The interference pattern produced by the RF coupler 300 may no longer correspond directly to the RF scene. Instead, the general relation of Eq. (1) holds between the RF sources and the detected RF signals by RF detector 190a, repeated below:

$$P_n = a_n \cdot S \tag{1}$$

where $a_n$ is a (abstract) vector corresponding to the n-th RF detector, S is a (abstract) vector corresponding to the distribution of sources in the k-space, i.e. the RF scene, and $P_n$ is the power detected by the n-th RF detector.

As noted, expression (1) can be manipulated to obtain the equivalent forms of Eqs. (2), repeated below:

$$P_n = \sum_m a_{nm} S_m \qquad (2)$$

$$P = AS$$

where the first of Eqs. (2) explicitly shows the summation of the dot product in Eq. (1) whereas the second of Eqs. (2) shows a compact notation involving matrix multiplication of (sought) vector S by matrix A to obtain the measured vector P of detected RF intensities. In Eq. (2), matrix A is determined by the details of the system including the geometry of the antenna array, the geometry of the RF waveguides 140a, 140b array, RF coupler 300, and the lengths of the waveguides 140a, as well as any additional RF phases applied to the RF signals conveyed by the RF channels. Vector S describes the RF scene in k-space, i.e. the frequencies (or frequency distributions), angles of arrival and intensities of the RF sources whose signals are received by the antenna array. Vector P comprises the intensities measured by the RF detectors 190a. Hence, the reconstruction of the RF scene based on detected (measured) RF intensities P may require the 'inversion' of the relation Eq. (2). Since matrix A may in general be rectangular (not square) and/or singular, such 'inversion' may not be well defined in general. In this case, an approximate, and 'most likely' vector S is sought that satisfies Eqs. (2) or Eq. (1). Note also that in Eq. (2), finding the left inverse of matrix A would be sufficient to reconstruct the scene.

Figure 19A:
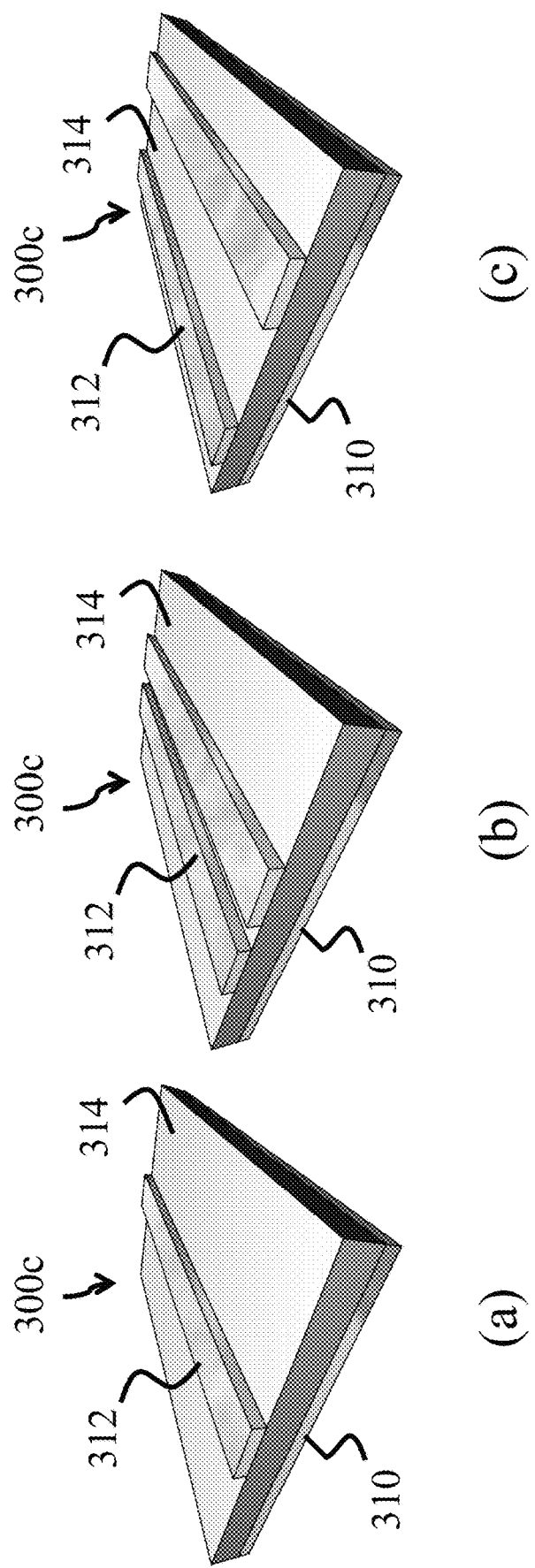
FIGS. 19A-19F illustrate details of example RF couplers, according to certain exemplary embodiments.

FIGS. 19A-19E illustrate details of exemplary RF couplers 300. It should be emphasized, that reference to RF coupler "300" may be a generic reference which may apply to any and all of the exemplary RF couplers described herein (e.g., 300a, 300b, 300c, 300d, 300e, 300f and their alternatives). In FIG. 19A, an RF coupler 300c may be implemented as a microstrip transmission line (or, simply, a microstrip), comprising ground plane 310, signal electrode 312 and dielectric 314 interposed between the ground plane 310 and the signal electrode 312. FIG. 19A (a) shows a single microstrip, which may comprise an input and/or an output to the RF coupler 300c and may be connected to a coaxial cable or other shielded RF waveguide at the input and/or output of the RF coupler 300c. The ground plane 310 may be a sheet (e.g., film) of a conductive material and the signal electrode 312 may be conductive wiring (e.g., strip). It should be emphasized that the phrase "ground plane" references a relatively large conducting surface serving to confine the electromagnetic field of the RF signals carried by the transmission lines. While a ground plane may have a planar geometry, other shapes may also be used for a ground plane. It also should be recognized that the ground plane may or may not be connected to a reference potential of ground. When waveguides 140a and 140b are implemented as coaxial cable (comprising an inner conductor surrounded by an insulating layer which are both enclosed by a metallic shield), end(s) of the signal electrode 312 may have a direct electrical connection to the inner conductor(s) of the coaxial cable(s), while the ground plane 310 and outer metallic shield of the coaxial cables may be connected to a constant reference potential, such as to ground.

As shown in FIGS. 19A, (b) and (c) illustrate plural microstrips comprising signal electrodes 312 formed on the same dielectric 314 and on the same ground plane 310. Although only two microstrips are illustrated in FIGS. 19A (b) and (c), each of plural microstrips are connected to a corresponding one of the waveguides 140a and a corresponding one of the waveguides 140b, e.g., as shown in and described with respect to FIGS. 18A and 18B. FIG. 19A (b) illustrates the spacing of the plural signal electrodes 312 relatively small, as compared to that of FIG. 19A (c), allowing relatively stronger coupling of the RF signals transmitted along the neighboring transmission lines. For example, the distance between signal electrodes smaller than ten times the thickness of the dielectric 314 may provide adequate coupling between the waveguides. More specifically, using 100-μm thick liquid-crystal polymer dielectric having the relative dielectric constant of about 3, and signal electrodes 250-μm wide, at the frequency around 100 GHz, the separation between signal electrodes of less than 1 mm may provide sufficiently strong coupling between the waveguides. Furthermore, to increase coupling, the separation between signal electrodes 312 may be reduced to zero, as in the example of FIG. 18C, so as to provide electrical connection between the signal electrodes. It should be appreciated that FIGS. 19A (a), (b) and (c) may represent different portions of the RF coupler 300 (such as different portions of RF coupler 300a or 300b illustrated in FIGS. 18A and 18B). In addition, the structures of FIG. 19A may also be used as the waveguides 140a and/or 140b themselves. In some designs, it may be desired to limit RF coupling to a certain portion of the system transmitting the RF signals, and have only limited or insignificant RF coupling at other locations. By increasing the spacing between neighboring signal electrodes 312 (as exemplified by FIG. 19A (c)), RF coupling may be decreased between neighboring microstrip transmission lines.

Figure 19B:
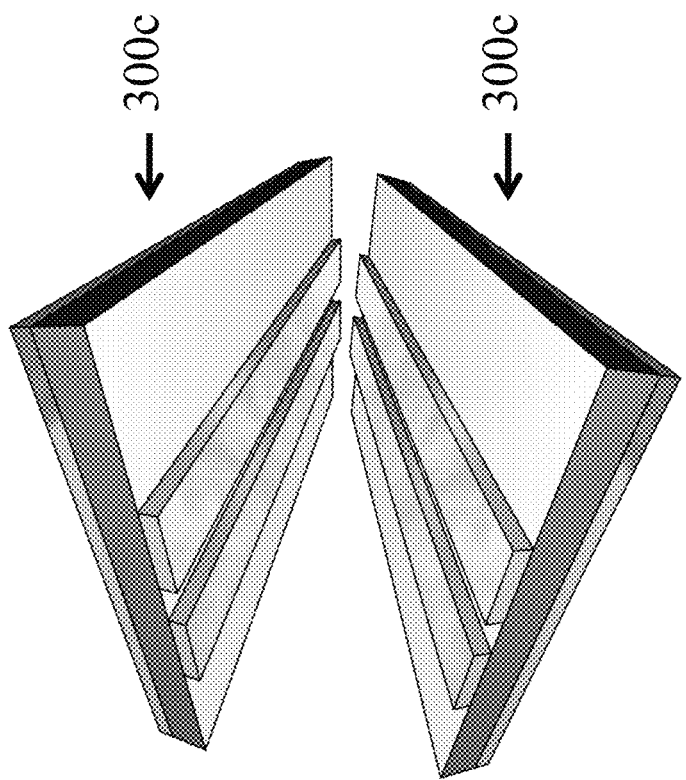
Figure 19C:
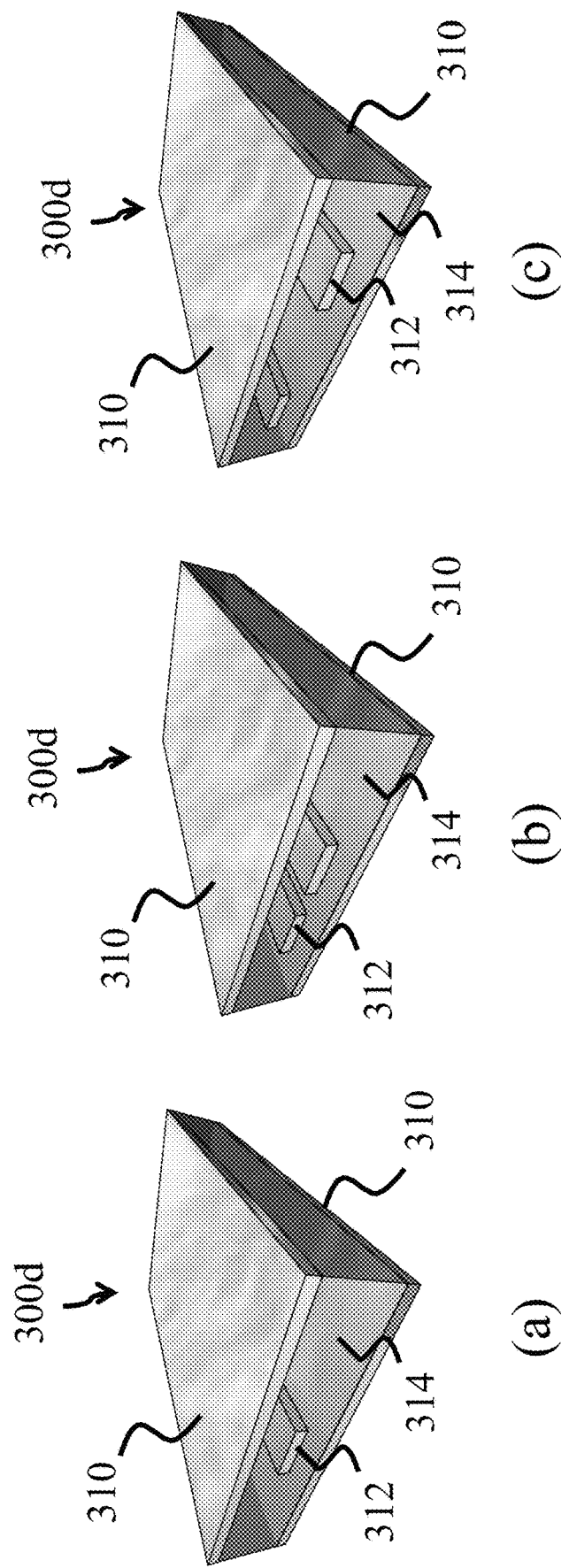

Although only two transmission lines with their respective signal electrodes 312 are illustrated in FIG. 19A (b) and (c), all of the transmission lines of the RF coupler 300 may be formed on the same dielectric 314 and ground plane 310 as shown. Alternatively, the microstrip transmission lines with signal electrodes 312 of the RF coupler may be formed on multiple ground plane/dielectric stacks (310/314) in various arrangements. For example, the multiple ground plane/dielectric stacks (310/314) may be arranged to have the signal electrodes 312 face each other (such as a stack of ground plane 310a, dielectric 314a, signal electrodes 312a, signal electrodes 312b, dielectric 314b and ground plane 310b in that order with a gap or dielectric interposed between signal electrodes 312a and 312b). FIG. 19B illustrates one such example with two sets of microstrips 300c facing each other with a gap between the sets of microstrips 300c. The structure of FIG. 19B can be considered as a particular implementation of a stripline, where one or more signal electrodes 312 are sandwiched between ground planes 310 (which may form a single electrical node). FIG. 19C (a), (b) and (c) illustrate several examples of the RF coupler 300d formed with a stripline configuration, with signal electrodes 312 of the transmission lines extending through a gap between two adjacent ground planes 310. The ground planes 310 sandwich dielectric 314 which surrounds the signal electrodes 312. The ground planes may be electrically connected and/or electrically and physically connected as a single integral conductive structure by conductive sidewalls (not shown) at the edges of the ground planes 310 to form a hollow tube (a conductive cuboid, or if the ground planes are formed to have a shape other than a geometrically planar shape, a hollow conductive cylinder or with an elliptical cross section, etc.). FIG. 19C (a) illustrates a single transmission line with signal electrode 312, while FIG. 19C (b) illustrates plural transmission lines with corresponding signal electrodes 312 having a relatively close spacing as compared to the relatively wide spacing of FIG. 19C (c) to respectively increase and decrease coupling of the RF signals carried by the transmission lines. Again, it should be appreciated that the illustration of only two striplines with respective two signal electrodes 312 in FIG. 19C (b) and (c) is for ease of illustration and explanation, and that more than two of the RF signals provided by antennas 120 of the antenna array 110 may be connected to a corresponding transmission line within the same stripline structure (e.g., all the RF signals provided by the antennas 120 via waveguides 140a may be connected to transmission lines with signal electrodes 312 that are sandwiched between two adjacent ground planes 310 and/or transmitted through a hollow conductive tube, such as 310').

Figure 19D:
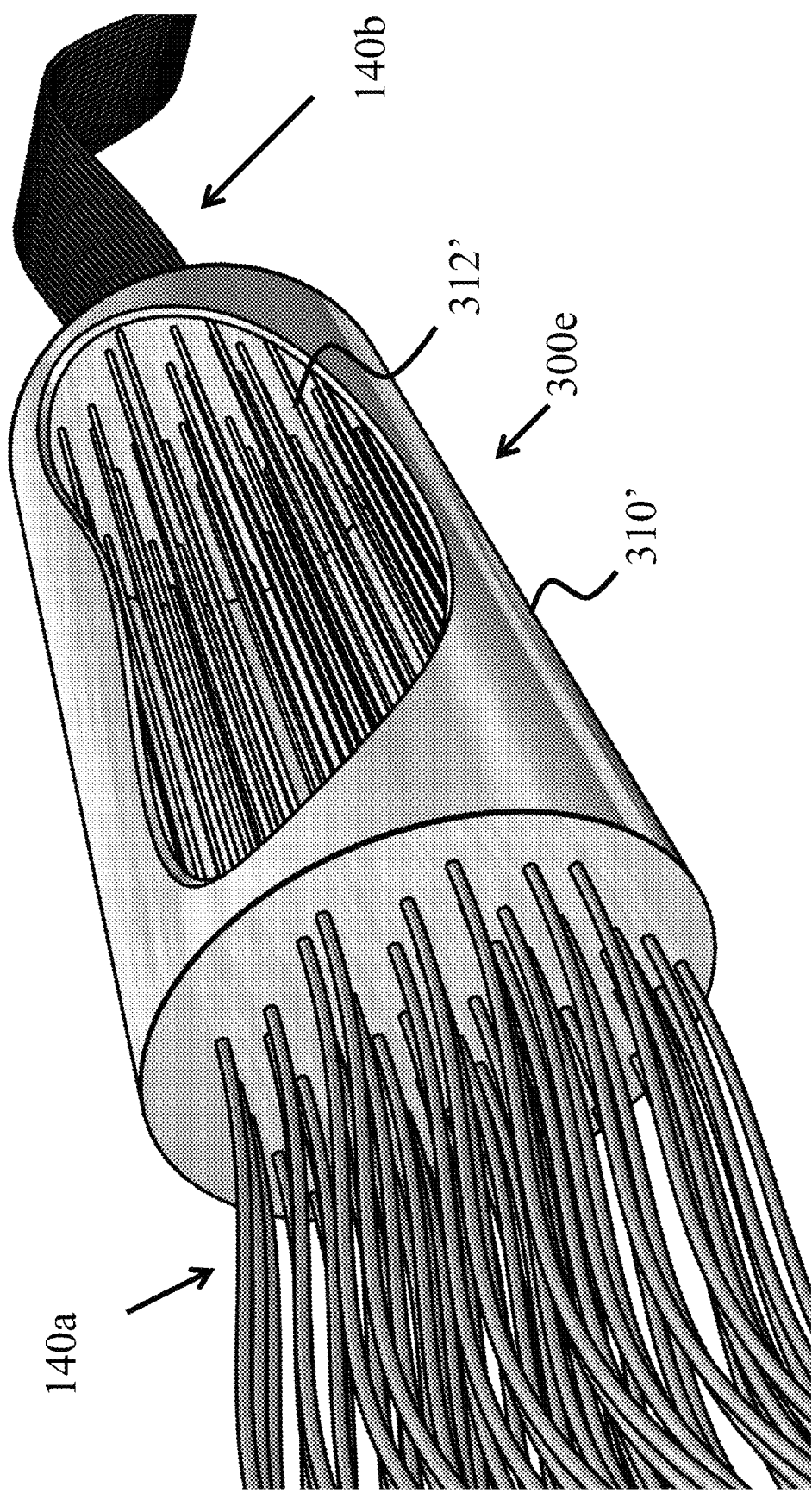

As noted, in some examples, the stripline configuration may comprise one or more transmission lines 312 extending through a conductive tube serving as the ground plane (which may be formed as a hollow cylinder, or hollow cuboid, or have some other shape). FIG. 19D illustrates one such example of an RF coupler 300e comprising signal electrodes 312' extending through hollow conductive cylinder 310' (which may be connected to a reference potential, such as ground). The hollow conductive cylinder 310' may be filled with a dielectric (not shown), which may be a solid insulator, liquid or gas (e.g., air). In this example, waveguides 140a are implemented as coaxial cable. Inner conductors of each of the coaxial cable waveguides 140a transition to a corresponding signal electrodes 312' of the RF coupler 300e (e.g., the inner conductors of the coaxial cables waveguides 140a are each electrically connected corresponding signal electrodes 312' which may take the form of continuing to extend into the hollow conductive cylinder 310' as the corresponding signal electrode 312' without the external conductive shielding of the coaxial cable waveguide 140a). Without individual shielding (as provided by the coaxial cables waveguides 140a) the electromagnetic field corresponding to the RF signals transmitted along the signal electrodes 312' within conductive cylinder 310' may extend to overlap adjacent signal electrodes, and hence be coupled among the signal electrodes 312' allowing the RF signals to interfere with each other within the RF coupler 300e.

At the output of the RF coupler 300e, the RF signals, or electrical signals (analog or digital) representing the power of the corresponding transmitted RF signals, are transmitted by waveguides 140b formed as a ribbon cable (having a plurality of conductors, each electrically connected to a corresponding one of the signal electrodes 312'). In alternative embodiments, the RF detector may be formed at the output of the RF coupler 300e and the ribbon cable may transmit on each of its conductors an analog signal corresponding to the power of a RF signal carried by a corresponding one of the signal electrodes 312' of the RF coupler 300e (where the analog signals are later converted to digital form by analog to digital converters 190b to which the ribbon cable 140b is connected. Alternatively, both the RF detector 190a and the analog to digital converter 190b may be formed at the output of the RF coupler 300e and the ribbon cable may transmit digital signals (in parallel or serial format, e.g.), each digital signal representing the detected power of an RF signal carried along a corresponding one of the signal electrodes 312' of the RF coupler 300e.

In a modification of the embodiment of FIG. 19D, hollow conductive cylinder 310' (and/or the conductive disk shaped caps enclosing ends of the body of the hollow conductive cylinder 310') may be eliminated, resulting in an RF coupler 300 comprising the plurality of signal electrodes 312' extending through free space, such as air, or a solid dielectric.

Figure 19E:
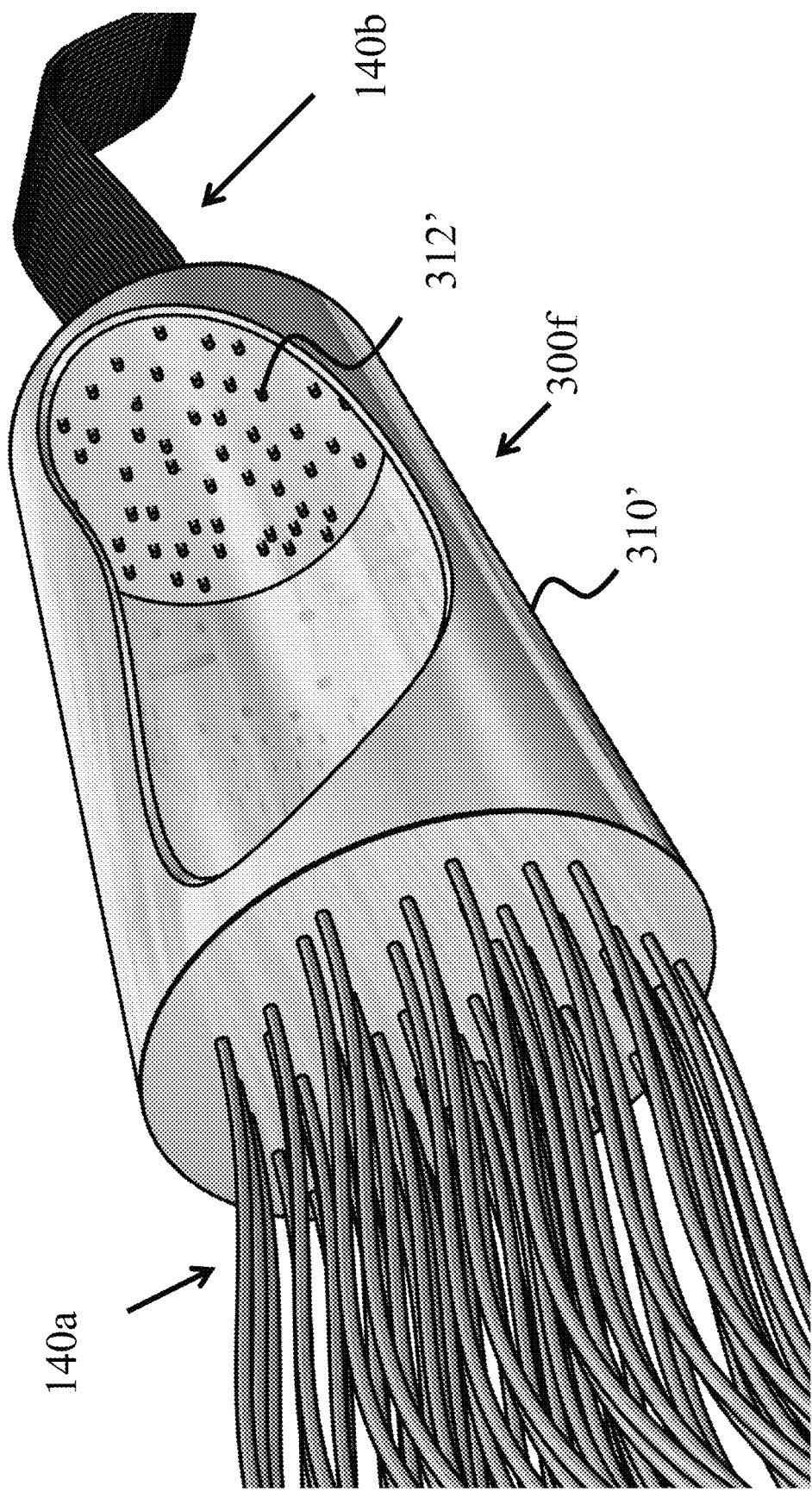

FIG. 19E illustrates another example of an RF coupler. RF coupler 300f may be implemented as described and discussed above with respect to FIG. 19D, but instead of the use of signal electrodes 312' extending through the length of the a conductive tube 310' of the RF coupler 300e, the transmission lines terminate within the conductive tube 310' at the input end of the RF coupler 300f (left side of FIG. 19E) and resume at the exit end of the RF coupler 300f (right side of FIG. 19E). The signal electrodes 312' may extend into the space of the hollow conductive tube 310' a certain length, each protrusion of the signal electrodes 312' into the hollow conductive tube 310' acting as a monopole antenna to radiate the corresponding RF signal (at the input end of the RF coupler 300f) and to receive a radiated RF signal (at the output end of the RF coupler 300f). Although FIG. 19E only illustrates the terminated signal electrodes 312' at the output end of the RF coupler 300f, the same structure may be used at the input end of RF coupler 300f. It will be appreciated that the number of transmission lines at the input end may be less or more than the number of transmission lines at the output end of the RF coupler 300f, and/or the spatial arrangement (e.g., physical layout) of the terminated transmission lines 312' may differ from each other at the input end and output ends of the RF coupler 300f.

Figure 19F:
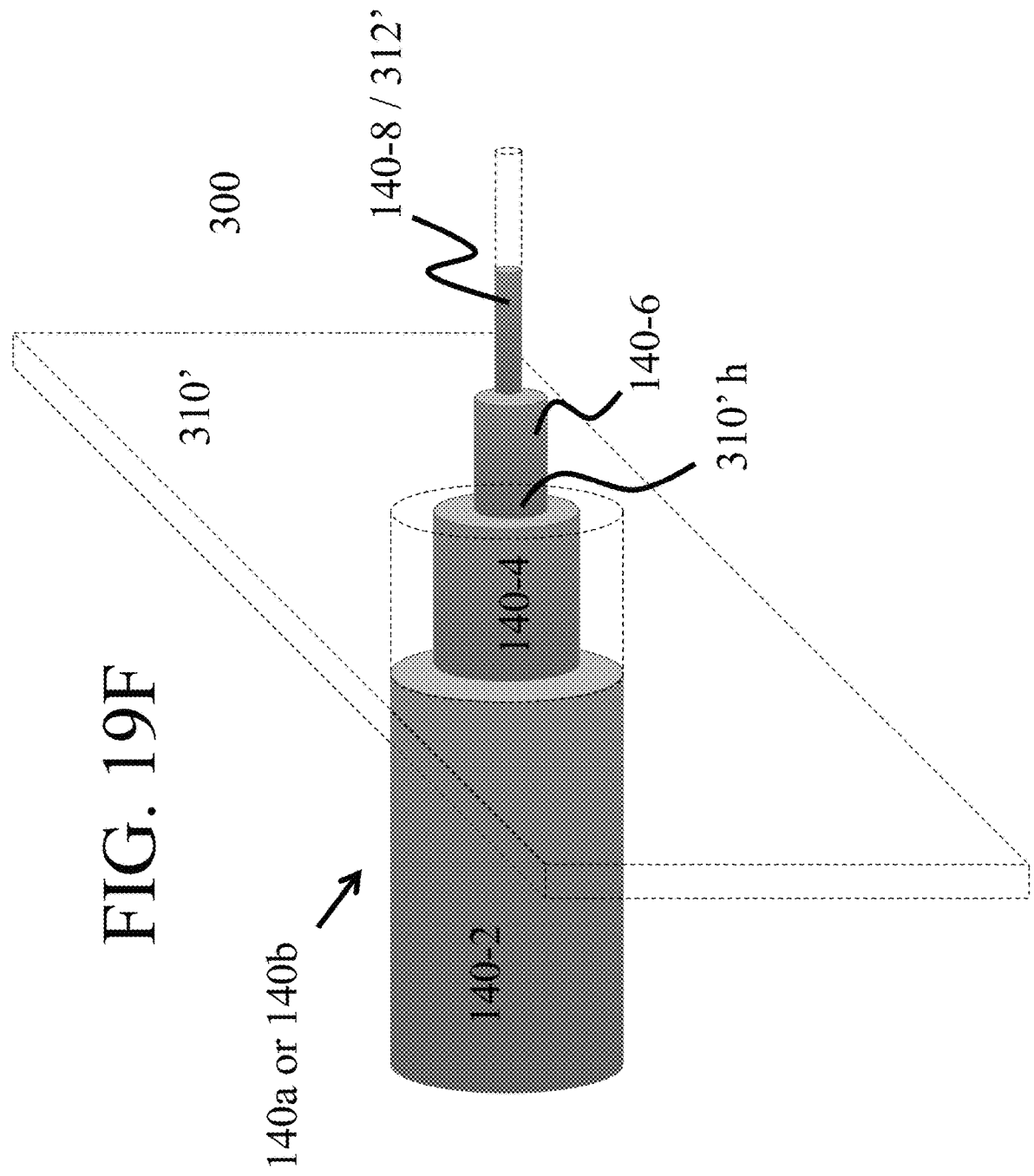

FIG. 19F illustrates exemplary details of an RF waveguide at the RF coupler 300. The structure shown in FIG. 19F may be implemented with respect to an input to the RF coupler (and thus represent RF waveguide 140a) and also may be implemented as part of an output from the RF coupler (and thus represent RF waveguide 140b). In this example, the RF waveguide 140a/140b is implemented as a coaxial cable, comprising concentrically arranged protective outer plastic sheath 140-2 surrounding a conductive electromagnetic shield 140-4 surrounding an inner dielectric 140-6 surrounding a signal electrode formed as an inner conductor 140-8. The inner conductor 140-8 may be solid, while the protective outer plastic sheath 140-2, the conductive electromagnetic shield 140-4 and the inner dielectric 140-6 may have tube shapes.

The end (either input end or exit end) of the RF coupler 300 is shown by dashed lines 310' which may correspond to one of the conductive disk shaped caps enclosing ends of the body of the hollow conductive cylinder 310' (either at the input side or exit side of the RF coupler 300, such as RF coupler 300e or 300f of FIG. 19D or 19E). The protective outer sheath 140-2 and conductive electromagnetic shield 140-4 of the RF waveguide 140a/140b terminate at the hollow conductive cylinder 310' of the RF coupler 300. A portion of the protective outer sheath is represented by dashed lines in FIG. 19F to help illustrate the structure of the coaxial cable implementation of the RF waveguide. Alternatively, the conductive electromagnetic shield 140-4 may extend partly or fully through hole 310'h in the hollow conductive cylinder 310' and terminate at the hollow conductive cylinder 310'.

As shown in FIG. 19F, the inner conductor 140-8 extends into (and is part of) the RF coupler 300, extending through hole 310'h in the hollow conductive cylinder 310'. In this example, the inner conductor 140-8 acts as a signal electrode of an RF transmission line. When the coaxial cable is used as an RF waveguide 140a, it transmits an RF electrical signal from a corresponding antenna 120 to the RF coupler 300, and when the coaxial cable is used as an RF waveguide 140b, it transmits an RF signal resulting from interference of the RF signals provided by two or more antennas 120. When implementing the RF coupler 300e of FIG. 19D, the inner conductor 140-8 may extend fully through the hollow conductive cylinder 310' (dashed lines extending from inner conductor 140-8 representing this option). When implementing the RF coupler 300f of FIG. 19E, the inner conductor 140-8 may project from the inner wall of hollow conductive cylinder 310' and terminate at a distance chosen to allow radiation of the RF signal (e.g., about one quarter the wavelength of the detected RF signal, which may be the same distance of a monopole or a dipole forming one of antennas 120). Inner dielectric 140-6 may extend through the hole 310'h to maintain separation between the inner conductor 140-8 and hollow conductive cylinder 310'. Outer conductive electromagnetic shield 140-4 may physically and electrically connect to the hollow conductive cylinder.

Figure 20:
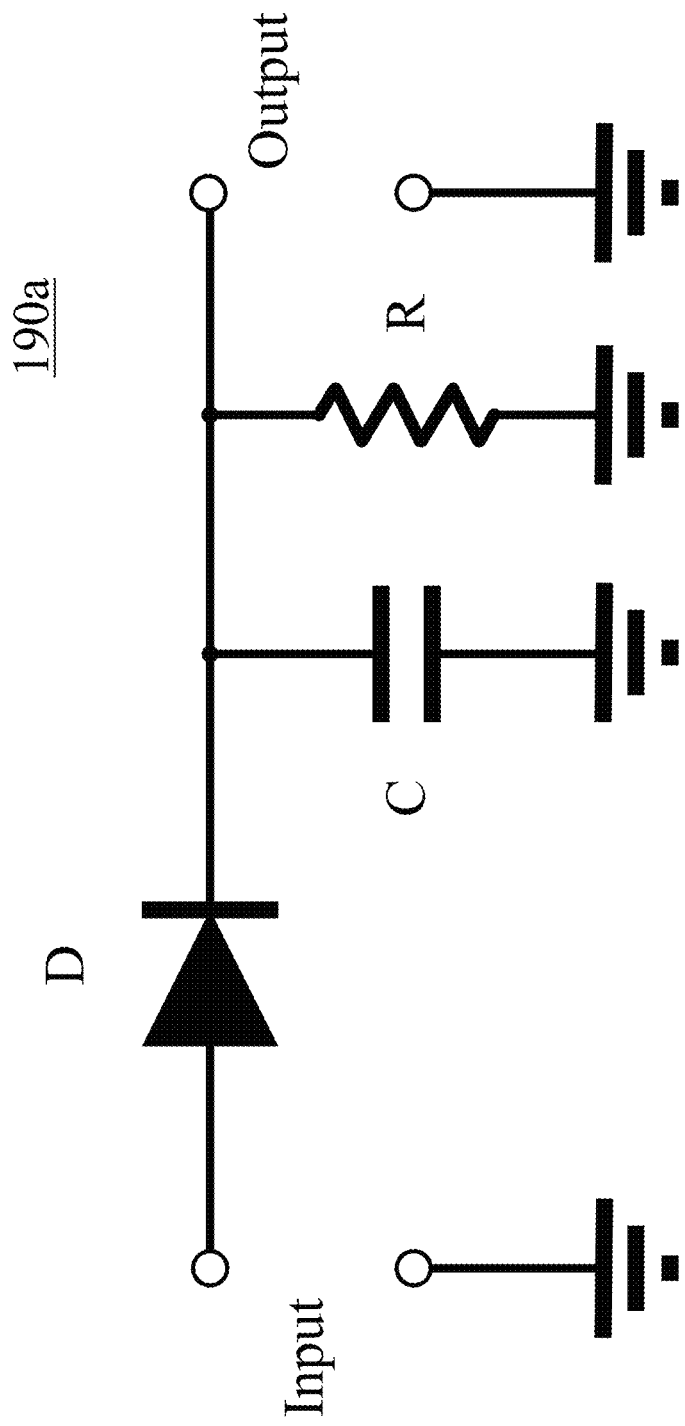
FIG. 20 illustrates an example of an RF detector for detecting the power of an RF signal received from a corresponding transmission line of an RF coupler, according to certain exemplary embodiments.

FIG. 20 illustrates an example of an RF detector 190a used to detect the power of an RF signal received from a corresponding transmission line of the RF coupler 300 (such as any of the RF transmission lines and RF couplers described herein). The RF detector 190a is connected at its input to a corresponding transmission line at the output of the RF coupler 300, with the corresponding signal electrode 312 having an electrical connection to the anode of a diode D. The cathode of the diode is connected to the output of the RF detector 190a, with a capacitor C and resistor R connected in parallel between the output and ground. In operation, the diode acts as a half-wave rectifier and transmits the positive voltage portion of the RF signal (a high frequency AC signal (e.g., sinusoidal signal)) received from the RF coupler 300 while blocking transmission of the negative potential portion of the RF signal. The capacitor C smooths the voltage waveform output from the diode D by storing charge while resistor R allows a continued gradual discharge by the capacitor C, thereby providing an output from the RF detector 190b corresponding to the power of the RF signal recently received. Because charge stored in the capacitor C received from the diode D dissipate to ground through resister R over time, the output by the RF detector 190a changes with time as the power of the received RF signal changes. It will be apparent that other rectifier circuits may be implemented than the single diode D as shown in FIG. 20, such as a full wave rectifier circuit.

Figure 21:
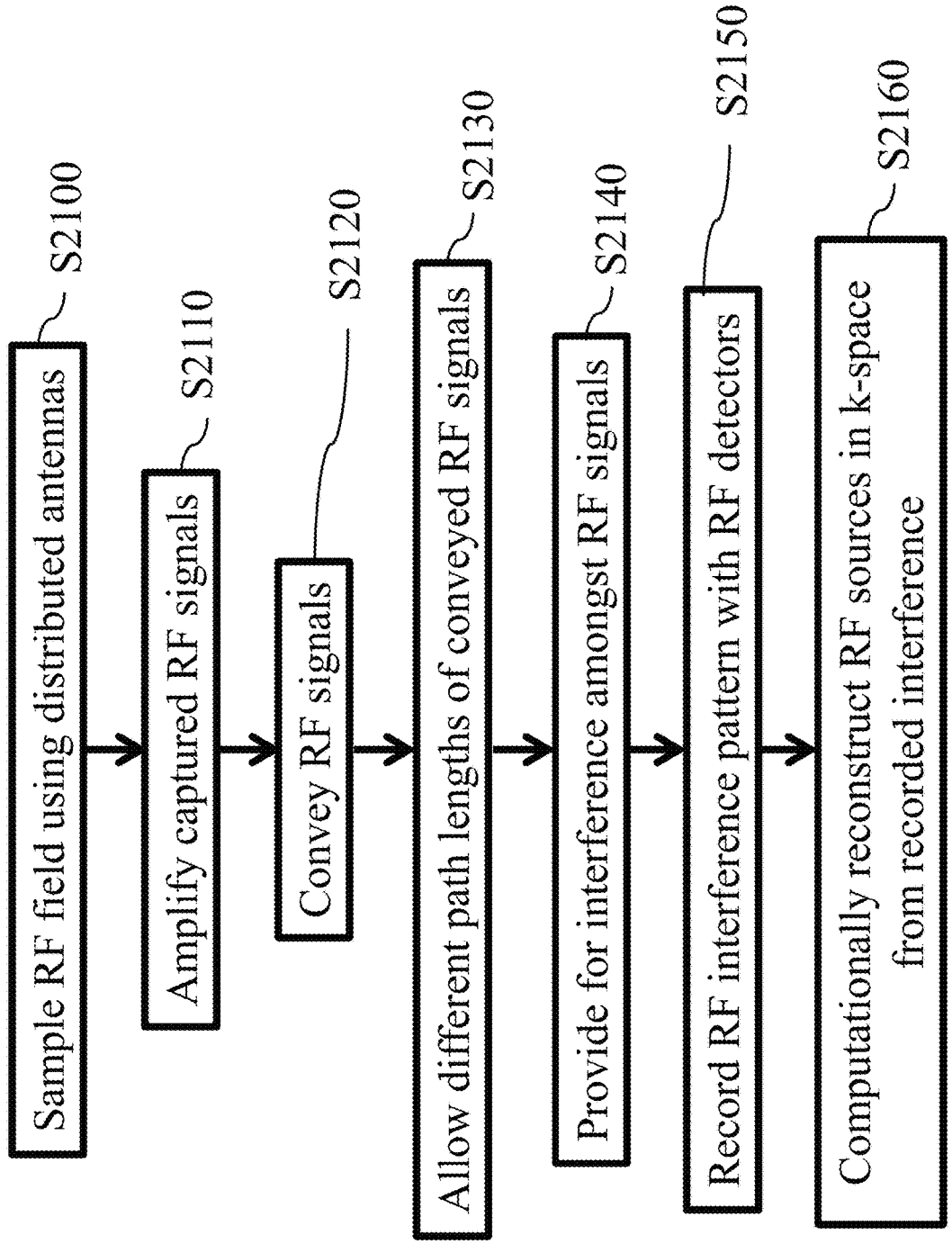
FIG. 21 illustrates an example method that may be implemented by RF domain k-space detectors, according to certain exemplary embodiments.

FIG. 21 illustrates an exemplary method that may be implemented by the above described RF domain k-space detectors. In general, between sampling the incoming electromagnetic radiation by the antennas 120 of the antenna array 110 and the array of RF detectors 190b, an interference module is provided that has an array of inputs and array of outputs, and affords the following: (1) each output of the RF coupler provided to the RF detector provides an RF signal resulting from RF signals from at least two RF inputs (e.g., RF signals provided by the antennas), (2) there are a variety of different time delays implemented in transmitting the RF signals from the antennas 120 to the inputs of the RF coupler 300.

In the example of FIG. 21, in step S2100, an RF scene in the real world is sampled by antennas of an antenna array. The RF scene may comprise RF radiation (electromagnetic waves) having a variety of frequencies and angle of arrivals with respect to an antenna array. The RF scene may be generated by a variety of sources, such as naturally generated RF, manmade generated RF from the RF source, or reflected RF (whether the original RF is generated from a manmade RF source or from a naturally occurring RF source). Each antenna 120 of the antenna array converts the detected RF radiation to a corresponding RF electrical signal.

In step S2110, each of the RF signals output by the antennas are optionally amplified prior to transmission to an RF coupler.

In steps S2120 and S2130, each of the RF signals are transmitted (S2120) to an RF coupler (such as RF couplers 300 described herein) via RF waveguides (e.g., coaxial cables), where individual paths of the RF signal transmission have a variety of different lengths (S2130). For example, each RF signal may be transmitted to the RF coupler via a corresponding coaxial cable, where the coaxial cables have a variety of different lengths. During transmission of the RF signals to the RF coupler, interference between the transmitted RF signals may be avoided or otherwise limited (e.g., by electromagnetic shielding), but in certain implementations interference between the transmitted RF signals may occur during this transmission. Although some of the path lengths may be substantially the same, many (e.g., a majority) of these path lengths may have substantially different path lengths. The path lengths of the RF signal transmissions may differ by multiples of the RF wavelength of the RF signals being transmitted. A maximum path-length difference may relate to the spectral resolution of the system. The different path lengths yield different signal delays between their capture at the antenna array 110 and the detection by detectors 190a. The spectral resolution may be generally proportional to the reciprocal of this maximum delay difference.

In step S2140, the transmitted RF signals interfere with one another in the RF coupler, such as by removing electrical shielding that was previously provided by the waveguides (e.g., coaxial cables) that transmitted the RF signals to the RF coupler. When interference is provided by an RF coupler, the RF coupler may receive as inputs the plurality of RF signals transmitted via different path lengths from the antenna array 120. The RF coupler may provide an RF interference pattern at its output comprising a plurality of individual output RF signals. Each output RF signal output from the RF coupler may include RF signal components from at least two RF signals input to the RF coupler (and thus from RF signals provided by at least two antennas). Thus, correlations may be made between the various received RF signals, including cross-correlation between signals captured by different antennas 120 of the array 110, and auto-correlation of a signal with its own delayed version. Further, spectral resolution may be obtained by performing cross-correlations of the received RF signals with respect to different times of when they were received by the antenna array 110.

The number of outputs of the RF coupler need not be the same as the number of inputs of the RF coupler. In some implementations, the number of RF signals output from the RF coupler (such as those described herein) may exceed the number of RF signals input to the RF coupler. To better utilize the information provided by the input RF signals, the number of outputs may be at least $[m*(m-1)]/2$ and more preferably at least $m*(m-1)$, where m is the number of inputs.

In step S2150, the resultant interference pattern provided by the plurality of outputs of the RF coupler is recorded. For example, each of the individual output RF signals output from the RF coupler is detected by a corresponding RF detector, such as by measuring (detecting) the RF power of each output RF signal. As the array of antennas sample the incoming waves spatially, spatial information is maintained in the RF interference pattern and provides information about the direction of propagation of the RF radiation.

In step S2160, the RF sources are reconstructed from the plurality of detected RF signals provided by the plurality of RF detectors, resulting in k-space information (direction and frequency (or frequencies)) for each RF source of the RF scene. Together, the resultant k-space information of the RF sources may be considered the RF equivalent of a visual image, where pixels forming the image of this RF scene have a location within the image (as provided by the determined direction, or angle of arrival, of an RF source) and color (frequency—or frequencies—of an RF source associated with the location).

It will be apparent to those of ordinary skill in the art that the inventive concepts described herein are not limited to the above exemplary implementations and the appended drawings and various changes in form and details may be made therein without departing from the spirit and scope of the following claims.

For example, a variety of waveguides may be used other than those described herein. For example, twisted-pair waveguides (two conductors twisted in helical fashion around each other) may be used as well, where interference between transmitted RF signals may be implemented in a region where each pair of conductors transmitting an RF signal are untwisted (e.g., extend in a straight line without twisting around each any other conductor) (e.g., such as shown in FIG. 19D in the RF coupler 300e, except that rather than using a coaxial cable to transmit RF signal to the RF coupler, a twisted-pair of conductors is used (one twisted pair for each RF signal being transmitted and input to the RF coupler 300e). Such a modification may be preferable for RF frequencies less than a few GHz (e.g., less than 3 GHz) where transmission losses of the RF signal are minimal or otherwise acceptable.

In addition, structure of the interference module after the RF coupler 300 may take several forms. For example, RF detectors 190a may be integral with the RF coupler 300 to immediately detect an output RF signal from the RF coupler 300 without the need to interpose RF waveguides 140b between the RF coupler 300 and the RF detectors 190a. Similarly, location of analog to digital converters 190b may be immediately adjacent to the RF couplers 300 or the analog signals provided by the RF detectors may be transmitted via appropriate conductive wiring 190c to the analog to digital converters.

Further, the different lengths of the waveguides should be understood to refer to the total signal path of the RF signal transmitted by the waveguide, rather than a linear dimension of the waveguide. Thus, a coiled coaxial cable that transmits an RF signal through its tubular length should be considered to have a length the same as in its uncoiled state. In general, lengths of the waveguides and/or other variations of the transmission paths of the RF signals may act to provide different time delays for each of the RF signals from the antennas 120 to the RF coupler 300.

Although the interference modules have been described herein as being performed in the RF domain and/or optical domain, other frequency domains may also be used to implement the interference module. In particular, the interference module may be implemented in the acoustic domain. For example, each of the RF signals detected by the antennas 120 of the antenna array may be downconverted by a mixer to an electrical signal having an acoustic frequency (e.g., between 20 to 20,000 Hz), or ultrasonic frequency (e.g. from 20 kHz up to several GHz). The electrical signal may be converted to an acoustic signal (e.g., by use of a speaker, or an electro-acoustic transducer) and transmitted along acoustic paths of different lengths, and allowed to interfere with each other at an acoustic coupler. Resulting acoustic interference pattern may be detected (e.g., individual signals detected by a plurality of microphones or electro-acoustic transducers) and subsequently processed as discussed above.

What is claimed:

1. A receiver system comprising:
a plurality of antennas, the plurality of antennas grouped into a first antenna array and a second antenna array;
a plurality of electro-optic modulators each connected to a corresponding one of the plurality of antennas to upconvert an RF electrical signal provided by the corresponding plurality of antennas to the optical domain and output first modulated optical signals corresponding to the first antenna array and second modulated optical signals corresponding to the second antenna array;
a plurality of first optical waveguides operatively connected through corresponding ones of the electro-optic modulators to the first antenna array, the first optical waveguides terminating at an interference space to provide first optical signal interference amongst the first modulated optical signals;
a plurality of second optical waveguides operatively connected through corresponding ones of the electro-optic modulators to the second antenna array, the second optical waveguides terminating at the interference space to provide second optical signal interference amongst the second modulated optical signals; and
an image plane at the interference space for receiving the first optical signal interference of the first modulated optical signals and the second optical signal interference of the second modulated optical signals,
wherein the first antenna array, the first optical waveguides, and the interference space form a first imaging receiver having a first achromatic axis, and
wherein the second antenna array, the second optical waveguides, and the interference space form a second imaging receiver having a second achromatic axis that is different from the first achromatic axis.

2. The receiver system of claim 1,
wherein optical path lengths of the plurality of first optical waveguides differ from one another,
wherein the first achromatic axis has a direction based upon the difference of the optical path lengths of the plurality of first optical waveguides,
wherein optical path lengths of the second plurality of optical waveguides differ from one another, and
wherein the second achromatic axis has a direction based upon the difference of the optical path lengths of the plurality of first optical waveguides.

3. The receiver system of claim 2,
wherein the optical path lengths of the plurality of first optical waveguides vary with respect to the positions of the antennas included in the first antenna array, and
wherein the optical path lengths of the plurality of second optical waveguides vary with respect to the positions of the antennas included in the second antenna array.

4. The receiver system of claim 3, wherein the antennas included in the first antenna array are interleaved among the antennas included in the second antenna array.

5. The receiver system of claim 1, further comprising:
a detector array that is configured to simultaneously receive the first optical signal interference of the first modulated optical signals and the second optical signal interference of the second modulated optical signals.

6. The receiver system of claim 1, further comprising:
a processor for computationally reconstructing RF waves in k-space from the first optical signal interference and second optical signal interference received at the image plane.

7. The receiver system of claim 6, further comprising:
a plurality of photodetectors to detect a first optical power of the first optical signal interference and a second optical power of the second optical signal interference, the detections of which are provided to the processor to computationally reconstruct the RF waves in k-space.

8. The receiver system of claim 6, wherein information corresponding to the reconstructed RF waves in k-space includes the frequency of the RF waves and the angle of arrival of the RF waves with respect to the plurality of antennas.

9. The receiver system of claim 1,
wherein the first optical waveguides terminate at the interference space to provide a first optical image of an RF scene captured by the first antenna array to the image plane,
wherein the second optical waveguides terminate at the interference space to provide a second optical image of the RF scene captured by the second antenna array to the image plane.

10. The receiver system of claim 1, wherein the plurality of first optical waveguides and the plurality of second optical waveguides comprise optical fibers.

11. A method for radio frequency (RF) signal processing, comprising:
receiving, at a plurality of antennas grouped into a first antenna array and a second antenna array, incoming RF signals from at least one RF source;
modulating the received RF signals from each of the plurality of antennas onto an optical carrier to generate first modulated optical signals corresponding to the first antenna array and second modulated optical signals corresponding to the second antenna array;
directing the first modulated optical signals to a plurality of first optical waveguides, each of the plurality of first optical waveguides having an output to emanate the corresponding first modulated optical signal to an interference space to provide first optical signal interference amongst the first modulated optical signals;
directing the second modulated optical signals to a plurality of second optical waveguides, each of the plurality of second optical waveguides having an output to emanate the corresponding second modulated optical signal to the interference space to provide second optical signal interference amongst the second modulated optical signals; and
receiving, at an image plane, the first optical signal interference of the first modulated optical signals and the second optical signal interference of the second modulated optical signals,
wherein the first antenna array, the first optical waveguides, and the interference space form a first imaging receiver having a first achromatic axis, and
wherein the second antenna array, the second optical waveguides, and the interference space form a second imaging receiver having a second achromatic axis that is different from the first achromatic axis.

12. The method of claim 11,
wherein optical path lengths of the plurality of first optical waveguides differ from one another,
wherein the first achromatic axis has a direction based upon by the difference of the optical path lengths of the plurality of first optical waveguides,
wherein optical path lengths of the second plurality of optical waveguides differ from one another, and
wherein the second achromatic axis has a direction based upon the difference of the optical path lengths of the plurality of first optical waveguides.

13. The method of claim 12,
wherein the optical path lengths of the plurality of first optical waveguides vary with respect to the positions of the antennas included in the first antenna array, and
wherein the optical path lengths of the plurality of second optical waveguides vary with respect to the positions of the antennas included in the second antenna array.

14. The method of claim 13, wherein the antennas included in the first antenna array are interleaved among the antennas included in the second antenna array.

15. The method of claim 11, wherein a detector array simultaneously receives the first optical signal interference of the first modulated optical signals and the second optical signal interference of the second modulated optical signals.

16. The method of claim 11, further comprising:
computationally reconstructing RF waves in k-space from the first optical signal interference and second optical signal interference.

17. The method of claim 16, further comprising:
detecting a first optical power of the first optical signal interference and a second optical power of the second optical signal interference; and
computationally reconstructing the RF waves in k-space based on the detected first optical power and the detected second optical power.

18. The method of claim 16, wherein information corresponding to the reconstructed RF waves in k-space includes the frequency of the RF signals and the angle of arrival of the RF waves with respect to the plurality of antennas.

19. The method of claim 11,
wherein the first optical waveguides terminate at the interference space to provide a first optical image of an RF scene captured by the plurality of antennas to the image plane,
wherein the second optical waveguides terminate at the interference space to provide a second optical image of the RF scene captured by the plurality of antennas to the image plane.

20. The method of claim 11, wherein the plurality of first optical waveguides and the plurality of second optical waveguides comprise optical fibers.

21. An optical imaging receiver comprising:
a plurality of antennas forming an antenna array configured to receive RF signals from at least one RF source;
a plurality of electro-optic modulators each connected to a corresponding one of the plurality of antennas to upconvert a radio frequency (RF) electrical signal provided by the corresponding antenna to the optical domain and output a corresponding modulated optical signal;
a plurality of optical waveguides configured to transmit the plurality of modulated optical signals, each of the plurality of optical waveguides having an output to emanate the corresponding modulated optical signal out of the corresponding optical waveguide to an interference space to provide optical signal interference amongst the modulated optical signals;
a plurality of photodetectors for recording the optical signal interference; and a processor configured to determine frequency and location information of the at least one RF source from the recorded optical signal interference,
wherein lengths of the plurality of optical waveguides vary with respect to the positions of the corresponding antennas in the antenna array to which the optical waveguides are connected.

22. The optical imaging receiver of claim 21, wherein the processor is configured to use a computational tomography technique to reconstruct the at least one RF source in k-space from the optical signal interference recorded by the photodetectors.

23. The optical imaging receiver of claim 21, wherein the plurality of optical waveguides comprise optical fibers.

24. A method utilized by an optical imaging receiver for RF signal processing, comprising:
receiving, at an antenna array including a plurality of antennas, incoming RF signals from at least one RF source;
modulating the received RF signals from each of the plurality of antennas onto an optical carrier to generate a plurality of modulated optical signals;
directing the plurality of modulated optical signals to a plurality of optical waveguides, each of the plurality of optical waveguides having an output to emanate the corresponding modulated optical signal out of the corresponding optical waveguide to an interference space to provide optical signal interference amongst the optical signals;
recording the optical signal interference; and
determining frequency and location information of the at least one RF source from the recorded optical signal interference,
wherein lengths of the plurality of optical waveguides vary with respect to the positions of the corresponding antennas in the antenna array to which the optical waveguides are connected.

25. The method of claim 24, wherein determining frequency and location information of the at least one RF source involves using a computational tomography technique to reconstruct the at least one RF source in k-space from the recorded optical signal interference.

26. The method of claim 24, wherein the plurality of optical waveguides comprise a plurality of optical fibers.

27. The method of claim 24, wherein the determining frequency and location information of the at least one RF source is performed in real time.

28. The method of claim 24,
wherein the at least one RF source comprises a first RF source and a second RF source, and
wherein determining frequency and location information of the at least one RF source comprises simultaneously determining the frequency and location information of the first RF source and the frequency and location information of the second RF source.

29. The method of claim 28, wherein determining the frequency and location information of the first RF source and the frequency and location information of the second RF source is determined in real time.

30. A receiver system comprising:
a plurality of antennas;
a plurality of electro-optic modulators each connected to a corresponding one of the plurality of antennas to upconvert a radio frequency (RF) electrical signal provided by the corresponding antenna to the optical domain and output a corresponding optical signal;
a plurality of first optical waveguides operatively connected through corresponding ones of the electro-optic modulators to first antennas of the plurality of antennas, the first antennas comprising some or all of the plurality of antennas, the first optical waveguides forming a first optical waveguide group;
a plurality of second optical waveguides operatively connected through corresponding ones of the electro-optic modulators to second antennas of the plurality of antennas, the second antennas comprising some or all of the plurality of antennas, the second optical waveguides forming a second optical waveguide group; and
an optical processor comprising at least one interference space and a plurality of detectors in optical communication with the at least one interference space,
wherein the first optical waveguide group terminates at the at least one interference space to provide a first optical signal interference corresponding to an RF scene captured by the plurality of antennas to the detectors,
wherein the second optical waveguide group terminates at the at least one interference space to provide a second optical signal interference corresponding to the RF scene captured by the plurality of antennas to the detectors,
wherein the first antennas, the first optical waveguide group and the optical processor form a first imaging receiver having a first achromatic axis, and
wherein the second antennas, the second optical waveguide group and the optical processor form a second imaging receiver having a second achromatic axis that is different from the first achromatic axis.

31. The receiver system of claim 30,
wherein optical path lengths of the plurality of first optical waveguides differ from one another,
wherein the first achromatic axis has a direction based upon the difference of the optical path lengths of the plurality of first optical waveguides,
wherein optical path lengths of the plurality of second optical waveguides differ from one another, and
wherein the second achromatic axis has a direction based upon the difference of the optical path lengths of the plurality of second optical waveguides.

32. The receiver system of claim 31,
wherein the optical path lengths of the first optical waveguides vary with respect to the positions of the first antennas, and
wherein the optical path lengths of second optical waveguides vary with respect to the positions of the second antennas.

33. The receiver system of claim 30, further comprising:
a processor for computationally reconstructing RF waves in k-space from the first optical signal interference and second optical signal interference received by the detectors.

34. The receiver system of claim 33, wherein the processor is configured to determine frequency and location information of at least one RF source in real time.

35. The receiver system of claim 33, wherein the processor is configured to determine frequency and location information of a plurality of RF sources simultaneously.

36. The receiver system of claim 33, wherein the processor is configured to determine frequency and location information of a plurality of RF sources simultaneously in real time.

37. The receiver system of claim 30, wherein the at least one interference space is a single contiguous interference space.

38. A receiver system comprising:
a plurality of antennas forming an antenna array;
a plurality of electro-optic modulators each connected to a corresponding one of the plurality of antennas to upconvert a radio frequency (RF) electrical signal provided by the corresponding antenna to the optical domain and output a corresponding optical signal;
a plurality of first optical waveguides each operatively connected to a corresponding one of the electro-optic modulators, the first optical waveguides forming a first optical waveguide group;
a plurality of second optical waveguides each operatively connected to a corresponding one of the electro-optic modulators, the second optical waveguides forming a second optical waveguide group;
a first optical processor comprising a first interference space and a first set of detectors in optical communication with the first interference space; and
a second optical processor comprising a second interference space and a second set of detectors in optical communication with the second interference space,
wherein the first optical waveguide group terminates at the first interference space to provide a first optical signal interference corresponding to an RF scene captured by the plurality of antennas to the first set of detectors,
wherein the second optical waveguide group terminates at the second interference space to provide a second optical signal interference corresponding to the RF scene captured by the plurality of antennas to the second set of detectors,
wherein the first optical waveguide group and the first optical processor form a first imaging receiver having a first achromatic axis, and
wherein the second optical waveguide group and the second optical processor form a second imaging receiver having a second achromatic axis that is different from the first achromatic axis.

39. The receiver system of claim 38,
wherein optical path lengths of the plurality of first optical waveguides differ from one another,
wherein the first achromatic axis has a direction based upon the difference of the optical path lengths of the plurality of first optical waveguides,
wherein optical path lengths of the plurality of second optical waveguides differ from one another, and
wherein the second achromatic axis has a direction based upon the difference of the optical path lengths of the plurality of second optical waveguides.

40. The receiver system of claim 39,
wherein the optical path lengths of the plurality of first optical waveguides and the plurality of second optical waveguides vary with respect to the positions of the antennas within the antenna array.

41. The receiver system of claim 38, wherein at least one first optical waveguide and at least one second optical waveguide is connected to each of the plurality of electro-optic modulators.

42. The receiver system of claim 38, further comprising:
a processor for computationally reconstructing RF waves in k-space from the first optical signal interference and second optical signal interference.

43. The receiver system of claim 42, wherein the processor is configured to determine frequency and location information of at least one RF source in real time.

44. The receiver system of claim 42, wherein the processor is configured to determine frequency and location information of a plurality of RF sources simultaneously.

45. The receiver system of claim 42, wherein the processor is configured to determine frequency and location information of a plurality of RF sources simultaneously in real time.

* * * * *